(12) United States Patent
Kakutani

(10) Patent No.: US 8,767,261 B2
(45) Date of Patent: Jul. 1, 2014

(54) PRINTING APPARATUS, PRINTING METHOD, PRINTING DATA GENERATION PROGRAM, AND DITHER MASK GENERATION METHOD

(75) Inventor: Toshiaki Kakutani, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 165 days.

(21) Appl. No.: 13/429,856

(22) Filed: Mar. 26, 2012

(65) Prior Publication Data
US 2012/0243052 A1 Sep. 27, 2012

(30) Foreign Application Priority Data
Mar. 24, 2011 (JP) ................. 2011-065689

(51) Int. Cl.
H04N 1/60 (2006.01)
H04N 1/407 (2006.01)
H04N 1/46 (2006.01)
H04N 1/52 (2006.01)
H04N 1/405 (2006.01)

(52) U.S. Cl.
CPC ............ H04N 1/52 (2013.01); H04N 1/4058 (2013.01)
USPC ......... 358/1.9; 358/3.06; 358/3.13; 358/3.14; 358/3.2; 358/3.26; 358/533; 358/534; 358/535

(58) Field of Classification Search
USPC ................... 358/3.06–3.23, 533–536
See application file for complete search history.

(56) References Cited

U.S. PATENT DOCUMENTS

| | | | | |
|---|---|---|---|---|
| 5,111,310 A | * | 5/1992 | Parker et al. | 358/3.19 |
| 5,293,430 A | * | 3/1994 | Shiau et al. | 382/173 |
| 5,550,569 A | * | 8/1996 | Wright | 347/15 |
| 5,726,772 A | * | 3/1998 | Parker et al. | 358/3.19 |
| 5,966,507 A | * | 10/1999 | Lin | 358/1.9 |
| 6,942,308 B2 | * | 9/2005 | Molinet et al. | 347/4 |
| 6,960,036 B1 | * | 11/2005 | Fujita et al. | 400/124.11 |
| 7,072,522 B2 | * | 7/2006 | Miyake et al. | 382/252 |
| 7,554,697 B2 | * | 6/2009 | Mizutani et al. | 358/3.12 |
| 7,616,340 B2 | * | 11/2009 | Yamazaki | 358/1.8 |
| 2002/0180816 A1 | * | 12/2002 | Haflinger | 347/12 |
| 2004/0150846 A1 | * | 8/2004 | Jeong | 358/1.9 |
| 2007/0086057 A1 | * | 4/2007 | Kanada | 358/3.06 |
| 2008/0192298 A1 | * | 8/2008 | Asai | 358/3.13 |
| 2009/0015871 A1 | * | 1/2009 | Kakutani | 358/3.13 |
| 2011/0019209 A1 | * | 1/2011 | Washio | 358/1.2 |

FOREIGN PATENT DOCUMENTS

JP 11-208031 A 8/1999
JP 2006-049959 A 2/2006

* cited by examiner

*Primary Examiner* — Richard Zhu
(74) *Attorney, Agent, or Firm* — Nutter McClennen & Fish LLP; John J. Penny, V.

(57) ABSTRACT

A printing apparatus which forms dots, according to dot data generated through comparison of a grayscale value of each of pixels with each of threshold values of a dither mask. The printing apparatus forms the dots through division into a plurality of pixel groups having different printing conditions and performs at least a part of the dot formation by the pixel groups in a common region. The dither mask has a second threshold value disposition, with respect to a first threshold value disposition which is each of dispositions of the respective threshold values set such that distribution of dots formed in the common region has noise characteristics having a peak on a high frequency side, in a case where a relative position of the dots between the pixel groups is formed in a target positional relationship which is a target in at least a part of a printing grayscale region.

12 Claims, 15 Drawing Sheets

RASTER ALTERNATION MODE

COLUMN ALTERNATION MODE

TASKEY MODE

FORMATION OF DOTS AT
OUTWARD MOVEMENT

PIXEL WHERE DOT IS FORMED
AT OUTWARD MOVEMENT

FORMATION OF DOTS AT
INWARD MOVEMENT

PIXEL WHERE DOT IS FORMED
AT INWARD MOVEMENT

FORMATION OF DOT AT BOTH OF OUTWARD
MOVEMENT AND INWARD MOVEMENT

CASE OF BEING SHIFTED
BY ABOUT ONE PIXEL

CASE OF BEING SHIFTED
BY ABOUT TWO PIXELS

DOT PAIRS

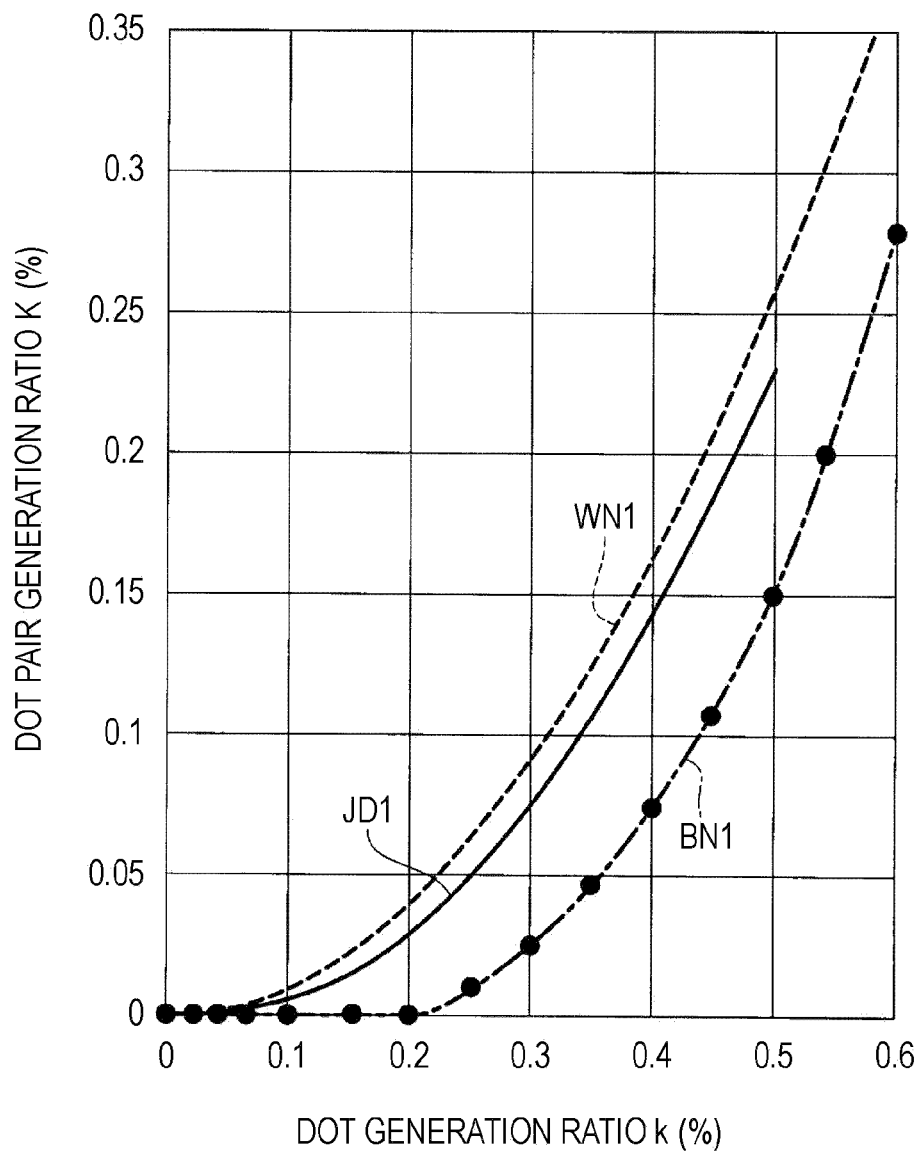

DISPERSIBILITY OPTIMUM DITHER MASK
(COLUMN ALTERNATION MODE)

SHIFTED DITHER MASK (INWARD MOVEMENT
THRESHOLD VALUE IS SHIFTED UPWARD BY 3 PIXELS)

SHIFTED DITHER MASK (INWARD MOVEMENT THRESHOLD VALUE IS SHIFTED LEFTWARD BY 3 PIXELS AND UPWARD BY 3 PIXELS)

SHIFTED DITHER MASK (INWARD MOVEMENT THRESHOLD VALUE IS SHIFTED LEFTWARD BY 3 PIXELS) (RASTER ALTERNATION MODE)

SHIFTED DITHER MASK (INWARD MOVEMENT THRESHOLD VALUE IS SHIFTED LEFTWARD BY 4 PIXELS) (TASKEY MODE)

PRINTING APPARATUS, PRINTING METHOD, PRINTING DATA GENERATION PROGRAM, AND DITHER MASK GENERATION METHOD

This application claims priority to Japanese Patent Application No. 2011-065689 filed on Mar. 24, 2011.

BACKGROUND

1. Technical Field

The present invention relates to a printing apparatus which performs printing by ejecting ink on a printing medium from a printing head.

2. Related Art

In a serial ink jet type printer, a printing head having a plurality of nozzles is relatively moved in the main scanning direction and sub-scanning direction with respect to a printing medium, and ink is ejected from the nozzles so as to form dots on the printing medium, thereby performing printing. In such an ink jet type printer, there are cases where a position shift occurs in which a landing position of the ink ejected from the nozzle of the printing head to the printing medium is shifted from a target position. Causes of the position shift may include a problem of operation accuracy of the printing head, a problem of paper feeding accuracy, and the like. For example, if ink ejection timings of the printing head at the outward movement and inward movement are not strictly constant, a relative positional relationship between a dot group formed at the outward movement of the printing head and a dot group formed at the inward movement thereof is shifted from a target position. The shift amount is fluctuated depending on a head scanning speed or a distance variation between the printing head and the printing medium. For this reason, if cockling occurs in which a paper sheet extends and undulates at a portion where an ink ejection amount per area on the printing medium is large, a distance between the printing head and the printing medium is locally fluctuated, and thus a position shift in reciprocation scanning is also fluctuated.

If this position shift fluctuation occurs, there are cases where local density unevenness is generated in a printing image, and thereby printing quality is deteriorated. Such a density unevenness phenomenon becomes notable as a printing speed is increased. This problem is not limited to the serial ink jet type printer, and is common to a printing apparatus which forms dots through division into a plurality of pixel groups having different printing conditions and performs at least a part of the dot formation by the plurality of pixel groups at a common region, thereby outputting printing images.

JP-A-2006-49959 is an example of the related art.
JP-A-11-208031 is another example of the related art.

SUMMARY

An advantage of some aspects of the invention is to suppress printing quality from being deteriorated due to density unevenness of a printing image.

APPLICATION EXAMPLE 1

A printing apparatus which forms dots on a printing medium and prints an image, including a printing portion that forms the dots on the printing medium and prints the image according to dot data, indicating whether or not the dots are formed, generated through comparison of a grayscale value of each of the pixels based on the image data of the image to be printed with each of the threshold values of a dither mask which is prepared in advance, wherein the printing portion forms the dots through division into a plurality of pixel groups having different printing conditions and performs at least a part of the dot formation by the plurality of pixel groups in a common region, and wherein the dither mask has a second threshold value disposition where threshold values corresponding to a part of groups of the plurality of pixel groups are shifted by a predetermined pixel in a predetermined direction, with respect to a first threshold value disposition which is each of the dispositions of the respective threshold values set such that the distribution of dots formed in the common region has noise characteristics having a peak on a high frequency side in the spatial frequency region, in a case where a relative position of the dots between the pixel groups is formed in a target positional relationship which is a target in at least a part of a printing grayscale region.

According to the printing apparatus having such a configuration, printing is performed according to dot data generated by the dither mask having a second threshold value disposition where threshold values corresponding to a part of groups of the plurality of pixel groups are shifted by a predetermined pixel in a predetermined direction, with respect to a first threshold value disposition which is each of the dispositions of the respective threshold values set such that the distribution of dots formed in the common region has noise characteristics having a peak on a high frequency side in the spatial frequency region. For this reason, it is possible to suppress a variation in coarseness and fineness due to a position shift direction or amount in a case where a relative position of the dots between the pixel groups is formed so as to be shifted from a target positional relationship which is a target, that is, a position shift occurs. As a result, it is possible to suppress printing image quality from being suppressed due to occurrence of density unevenness in a printing image of the common region. In addition, the first threshold value disposition which is a base of the dither mask has noise characteristics having a peak located further on the high frequency side than the low frequency side which is equal to or less than a predetermined spatial frequency in the spatial frequency region, and thus a printed image shows characteristics close to the so-called blue noise characteristic at least in the common region, thereby securing a predetermined extent of graininess.

APPLICATION EXAMPLE 2

The printing apparatus according to Application Example 1, wherein the first threshold value disposition is set such that, for each of the plurality of pixel groups, distribution of dots belonging to the pixel group has noise characteristics having a peak on the high frequency side in the spatial frequency region.

According to the printing apparatus having such a configuration, it is possible to suppress deterioration of graininess in the entire common region even if a position shift occurs. The second threshold value disposition where the threshold values are shifted with respect to the first threshold value disposition exerts the same influence on printing image quality as a position shift, and thus graininess is more deteriorated than in the first threshold value disposition, but such deterioration can be suppressed.

APPLICATION EXAMPLE 3

The printing apparatus according to Application Example 1 or 2, wherein the predetermined direction is one or two direction, wherein the printing apparatus has singularity in a direction where a relative position of dots between the pixel groups is shifted from a target positional relationship which is a target, and wherein, in relation to a shift amount of the threshold value in the second threshold value disposition, a shift amount in a direction different from a specific direction having the easily shifted singularity is larger than a shift amount in the specific direction.

According to the printing apparatus having such a configuration, a variation range of the sum of a threshold value shift amount and a practical position shift amount, that is, a substantial threshold value shift range is close to a case where there is no position shift, and thus the dot dispersion characteristic is stabilized. In addition, the threshold value shift amount can be made to be small. Therefore, an image printed in the common region can be maintained in a predetermined extent of high quality.

APPLICATION EXAMPLE 4

The printing apparatus according to any one of Application Examples 1 to 3, further including a dot data generation portion that generates the dot data using the dither mask.

The printing apparatus may include the dot data generation portion as in Application Example 4. With this, the printing apparatus in a narrow sense can perform printing independently.

APPLICATION EXAMPLE 5

The printing apparatus according to Application Example 4, further including a receiving portion that receives the kind of printing medium, wherein the dot data generation portion configures the image so as to be printed according to the dot data which is generated using a first dither mask having the first threshold value disposition instead of a second dither mask which is the dither mask having the second threshold value disposition, and determines the dither mask which is used from the first dither mask and the second dither mask according to the received kind of printing medium.

According to the printing apparatus having such a configuration, the first dither mask having good graininess and the second dither mask having notable effects of suppressing density unevenness can be divided and used depending on the kind of printing medium. Therefore, it is possible to perform ideal printing depending on circumstances.

APPLICATION EXAMPLE 6

The printing apparatus according to Application Example 5, further including a dither mask generation portion that generates the other dither mask by shifting threshold values corresponding to the part of groups of one dither mask with respect to the one dither mask of the first dither mask and the second dither mask.

According to the printing apparatus having such a configuration, since it is not necessary to store two dither masks, a storage capacity of the printing apparatus can be reduced. Alternatively, a limited storage capacity can be effectively utilized.

The printing apparatus of the invention may be widely applied to printing apparatuses where dots are formed through division into a plurality of pixel groups having different printing conditions, and at least a part of the dot formation by the plurality of pixel groups is performed in a common region, thereby outputting printing images. For example, the printing apparatus may be realized as printing apparatuses of the following Application Examples 7 to 10.

APPLICATION EXAMPLE 7

The printing apparatus according to any one of Application Examples 1 to 6, wherein the printing portion forms the dots by reciprocating a printing head in a main scanning direction and ejecting ink from the printing head in both of an outward movement main scanning and an inward movement main scanning, and thereby prints the image, and wherein the plurality of pixel groups include a pixel group where the dots are formed by the outward movement main scanning and a pixel group where the dots are formed by the inward movement main scanning.

APPLICATION EXAMPLE 8

The printing apparatus according to any one of Application Examples 1 to 6, wherein the printing portion forms the dots by making a printing head scan in a main scanning direction and ejecting ink from the printing head, and prints the image of a predetermined region by a plurality of main scannings, and wherein the plurality of pixel groups include the respective pixel groups where the dots are formed by different main scannings of the plurality of main scannings.

APPLICATION EXAMPLE 9

The printing apparatus according to any one of Application Examples 1 to 6, further including a plurality of printing heads that are arranged over a printing range and form the dots on the printing medium, wherein the printing heads adjacent to each other among the plurality of printing heads partially overlap each other in the arrangement direction, and wherein the printing portion forms the dots by relatively moving the printing medium with respect to the plurality of printing heads and ejecting ink from the plurality of printing heads, and thereby prints the image, wherein the plurality of pixel groups include the respective pixel groups where the dots are formed by different printing heads among the plurality of printing heads, and wherein the common region is a region where the printing heads adjacent to each other overlap each other.

APPLICATION EXAMPLE 10

The printing apparatus according to any one of Application Examples 1 to 6, further including a plurality of nozzle strings of which nozzles are arranged over a printing range and that eject ink and are provided in a direction intersecting the arrangement direction, wherein the printing portion forms the dots by relatively moving the printing medium in the intersecting direction with respect to the plurality of nozzle strings and ejecting ink from the plurality of nozzle strings, and thereby prints the image, and wherein the plurality of pixel groups include the respective pixel groups where the dots are formed by different nozzle strings among the plurality of nozzle strings.

The printing apparatus of the invention may be understood as a printing apparatus of the following Application Example 11. Of course, the configurations of the above-described Application Examples 2 to 10 may be added to Application Example 11.

APPLICATION EXAMPLE 11

A printing apparatus which forms dots on a printing medium and prints an image, including a printing portion that forms the dots on the printing medium and prints the image according to dot data, indicating whether or not the dots are formed, generated through comparison of a grayscale value of each of the pixels based on the image data of the image to be printed with each of the threshold values of a dither mask which is prepared in advance, wherein the printing portion forms the dots through division into a plurality of pixel groups having different printing conditions and performs at least a part of the dot formation by the plurality of pixel groups in a common region, and wherein the dither mask has a threshold value disposition where threshold values corresponding to a part of groups of the plurality of pixel groups are shifted by a predetermined pixel in a predetermined direction, with respect to the respective dispositions of the threshold values which are set such that a covering ratio which is a ratio of the area where each of the dots covers the printing medium is larger than that when the dots are formed to be shifted from the target positional relationship, in a case where a relative position of the dots between the plurality of pixel groups is formed in a target positional relationship which is a target in at least a part of a printing grayscale region.

The present invention may be realized as a manufacturing method of a dither mask of the following Application Example 12 and a manufacturing method of a printing apparatus of the following Application Example 13. In addition, the aspects of Application Examples 2 to 11 may be added thereto. Further, the present invention may be realized as a program for manufacturing a dither mask, a storage medium in which the program is recorded in a computer readable manner, and the like.

APPLICATION EXAMPLE 12

A manufacturing method of a dither mask in a printing apparatus which forms dots on a printing medium and prints an image by performing the dot formation on the printing medium through division into a plurality of pixel groups having different printing conditions and performing at least a part of the dot formation by the plurality of pixel groups in a common region, wherein the dither mask, formed by the respective threshold values, is used to generate dot data indicating whether or not the dots are formed, through comparison of a grayscale value of each of the pixels based on the image data of the image to be printed with each of the threshold values of a dither mask which is prepared in advance, the method including determining a disposition of the respective threshold values which are set such that distribution of dots formed in the common region has noise characteristics having a peak on a high frequency side in the spatial frequency region, in a case where a relative position of the dots between the pixel groups is formed in a target positional relationship which is a target in at least a part of a printing grayscale region; and generating the dither mask by shifting threshold values corresponding to a part of groups of the plurality of pixel groups by a predetermined pixel in a predetermined direction, with respect to each of the dispositions of the threshold values determined in the determining of the disposition.

APPLICATION EXAMPLE 13

A manufacturing method of a printing apparatus which forms dots on a printing medium, prints an image, and includes a printing portion that forms the dots on the printing medium and prints the image according to dot data, indicating whether or not the dots are formed, generated through comparison of a grayscale value of each of the pixels based on the image data of the image to be printed with each of the threshold values of a dither mask which is prepared in advance; and a storage portion that stores the dither mask, wherein the printing portion forms the dots through division into a plurality of pixel groups having different printing conditions and performs at least a part of the dot formation by the plurality of pixel groups in a common region, the method including preparing the printing apparatus; determining a disposition of the respective threshold values of the dither mask which are set such that distribution of dots formed in the common region has noise characteristics having a peak on a high frequency side in the spatial frequency region, in a case where a relative position of the dots between the pixel groups is formed in a target positional relationship which is a target in at least a part of a printing grayscale region; generating the dither mask by shifting threshold values corresponding to a part of groups of the plurality of pixel groups by a predetermined pixel in a predetermined direction, with respect to each of the dispositions of the threshold values determined in the determining of the disposition; and recording the generated dither mask in the storage portion in a computer readable manner.

BRIEF DESCRIPTION OF THE DRAWINGS

The invention will be described with reference to the accompanying drawings, wherein like numbers reference like elements.

FIG. 8 is a graph illustrating a relationship between a dot generation ratio and a dot pair generation ratio.

DESCRIPTION OF EXEMPLARY EMBODIMENTS

A. Embodiments

Embodiments of the invention will be described.

A-1. Apparatus Configuration

Figure 1:
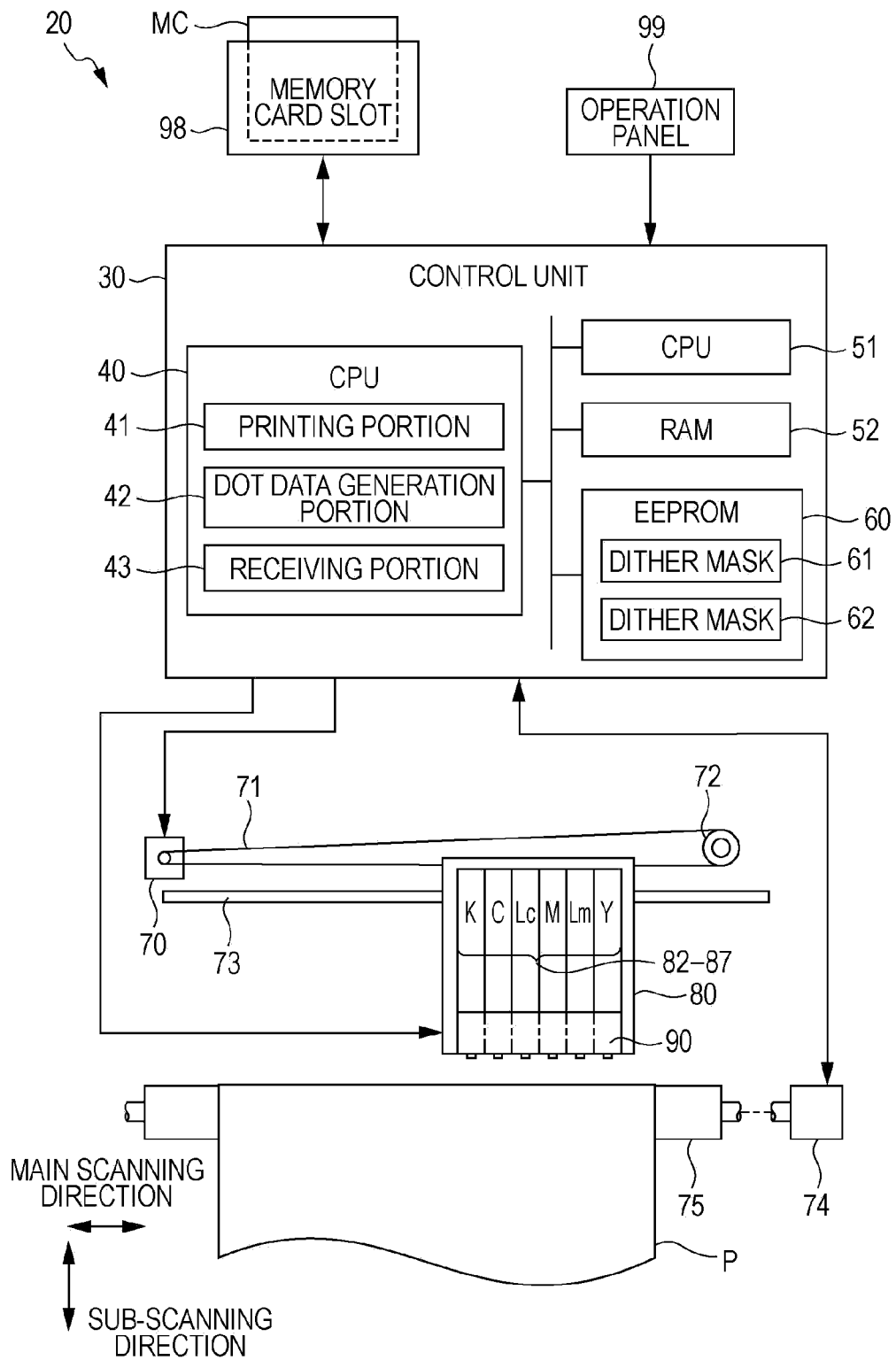
FIG. 1 is a schematic configuration diagram of a printer which is an example of the printing apparatus according to an embodiment of the invention.

FIG. 1 is a schematic configuration diagram of a printer 20 which is an example of the printing apparatus according to an embodiment of the invention. The printer 20 is a serial ink type printer which performs bidirectional printing. As shown in the figure, the printer 20 includes a mechanism which transports a printing medium P by a paper feeding motor 74, a mechanism which reciprocates a carriage 80 in an axial direction of a platen 75 by a carriage motor 70, a mechanism which performs ink ejection and dot formation by driving a printing head 90 mounted on the carriage 80, and a control unit 30 which exchanges signals with the paper feeding motor 74, the carriage motor 70, the printing head 90, and an operation panel 99.

The mechanism which reciprocates the carriage 80 in the axial direction of the platen 75 includes a perturbation shaft 73 which is built parallel to the axis of the platen 75 and holds the carriage 80 slidably, a pulley 72 which stretches an endless belt 71 between carriage motors 70, and the like.

The carriage 80 has ink cartridges 82 to 87 for color ink, respectively accommodating cyan ink (C), magenta ink (M), yellow ink (Y), black ink (K), light cyan ink (Lc), and light magenta ink (Lm) as color ink, mounted therein. The printing head 90 on the lower part of the carriage 80 is provided with a nozzle string corresponding to each color ink described above. If the ink cartridges 82 to 87 are installed in the carriage 80 from the upper side, ink can be supplied to the printing head 90 from each of the cartridges.

The control unit 30 includes a CPU 40, a ROM 51, a RAM 52, and an EEPROM 60, which are connected to each other via a bus. The control unit 30 controls the overall operations of the printer 20 by developing programs stored in the ROM 51 or the EEPROM 60 on the RAM 52 so as to be executed, and also functions as a printing portion 41, a dot data generation portion 42, and a receiving portion 43. Details of the functional portions will be described later.

The EEPROM 60 stores dither masks 61 and 62. The dither masks 61 and 62 are used for a dot dispersion type halftone process according to a systematic dithering method. The dither masks 61 and 62 are configured by a plurality of threshold values being stored in the same number of storage elements. The dither masks 61 and 62 have different characteristics. Disposition of the threshold values of the dither mask 61 has a so-called blue noise characteristic, and thus can realize high dot dispersibility. Disposition of the threshold values of the dither mask 62 is obtained by shifting a part of the threshold values from the disposition of the threshold values of the dither mask 61 by a predetermined amount in a predetermined direction. Details thereof will be described later, and the dither mask 62 has a characteristic in which occurrence of density unevenness is suppressed even if a dot formation position is shifted from a target position.

The control unit 30 is connected to a memory card slot 98, and can read image data ORG from a memory card MC inserted into the card slot 98 for input. In other words, in the embodiment, printing is independently performed by the printer 20. In the embodiment, the image data ORG input from the memory card MC is data including three-color components of red (R), green (G), and blue (B).

The printer 20 having the above-described hardware configuration reciprocates the printing head 90 with respect to the printing medium P in the main scanning direction through driving of the carriage motor 70, and moves the printing medium P in the sub-scanning direction through driving of the paper feeding motor 74. The control unit 30 drives the nozzles based on printing data at appropriate timings so as to correspond with the movement (main scanning) of the reciprocation of the carriage 80 or the movement (sub-scanning) of paper feeding of the printing medium, and thereby forms ink dots of appropriate ink at appropriate positions on the printing medium P. Thereby, the printer 20 can print color images input from the memory card MC on the printing medium P.

A-2. Printing Process

Figure 2:
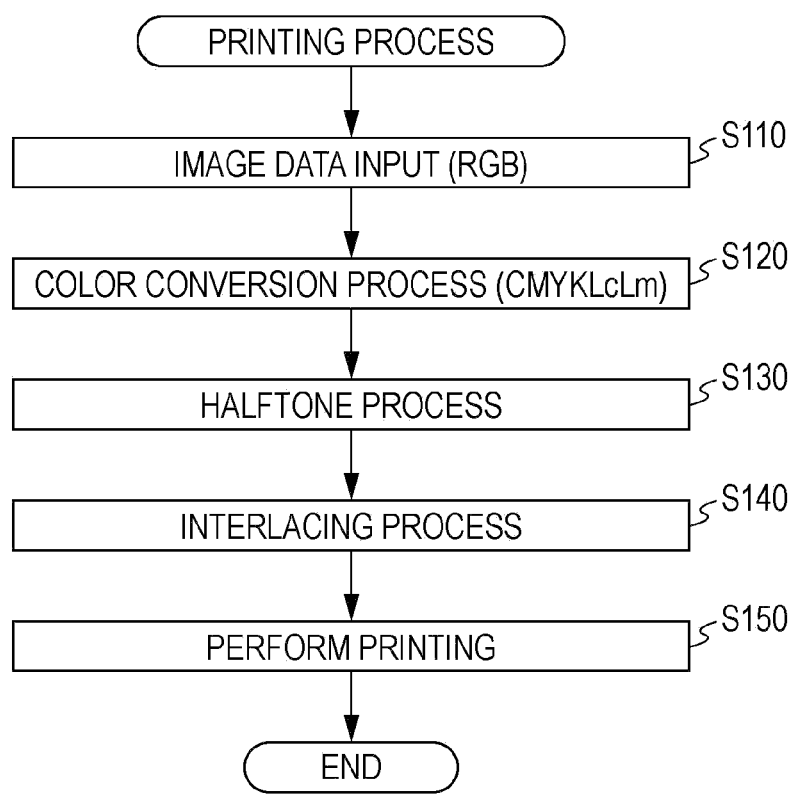
FIG. 2 is a flowchart illustrating the flow of a printing process in the printer.

A printing process in the printer 20 will be described. FIG. 2 is a flowchart illustrating a printing process in the printer 20. The printing process here is started by a user performing a printing instruction operation of a predetermined image stored in the memory card MC, using the operation panel 99 or the like. If the printing process is started, first, the CPU 40 reads and inputs image data ORG of an RGB format which is a printing target, from the memory card MC via the memory card slot 98 (step S110).

If the image data ORG is input, the CPU 40 refers to a lookup table (not shown) stored in the EEPROM 60, and color-converts the RGB format into a CMYKLcLm format with respect to the image data ORG (step S120).

If the color conversion process is performed, the CPU 40 performs a halftone process where the image data is converted into ON and OFF date (hereinafter, also referred to as dot data) of dots of each color (step S130) as a process performed by the dot data generation portion 42. This process is performed using a dithering method in the embodiment. In other words, of input data and a plurality of threshold values forming the dither masks, the input data is compared with a threshold value stored in a storage element at a position corresponding to the input data, and if the input data is larger than the threshold value, dot ON is determined, and if the input data is equal to or smaller than the threshold value, dot OFF is determined.

A dither mask used for the halftone process is selected from the dither mask 61 and the dither mask 62. The dither mask is selected depending on the kind of printing medium which is used. Specifically, a user inputs the kind of printing medium which is used from the operation panel 99 when performing a printing instruction operation of the image data ORG. The control unit 30 receives the kind of printing medium as a process performed by the receiving portion 43, and selects a dither mask which is correlated with the kind of printing medium in advance, from the dither masks 61 and 62.

In the embodiment, for a printing medium where the density unevenness of a printing image due to cockling is not likely to be a problem, the dither mask 61 is selected. On the other hand, for a printing medium where density unevenness of a printing image due to cockling is very likely to be a problem, the dither mask 62 is selected. The printing medium where density unevenness of a printing image due to cockling is not likely to be a problem is, for example, a thick printing medium, or a printing medium having an ink absorbing layer. The printing medium where density unevenness of a printing image due to cockling is very likely to be a problem is, for example, a thin printing medium, or regular paper not having an ink absorbing layer.

In the halftone process, the selected dither mask 61 or dither mask 62 is repeatedly applied to the respective input data arranged in the main scanning direction and sub-scanning direction, in the main scanning direction and sub-scanning direction. In addition, the halftone process is not limited to the binary process of dot ON and OFF, and may be a multi-value process such as ON and OFF of a large dot and a small dot. In addition, the image data supplied in step S130 may be image data which has undergone an image process such as a resolution conversion process or a smoothing process. Alternatively, the image data supplied in step S130 may be a grayscale value indicating a dot formation ratio which is obtained from a color grayscale value of the image data ORG. That is to say, the image data supplied in step S130 may be a grayscale value of each pixel based on the received image data ORG.

After the halftone is performed, the CPU 40 performs an interlace process where the image data is rearranged to dot pattern data so as to correspond with the nozzle disposition or a paper feeding amount of the printer 20 (step S140). After the interlace process is performed, the CPU 40 performs printing by driving the printing head 90, the carriage motor 70, a motor 74, and the like, performed by the printing portion 41 (step S150).

Figure 3:
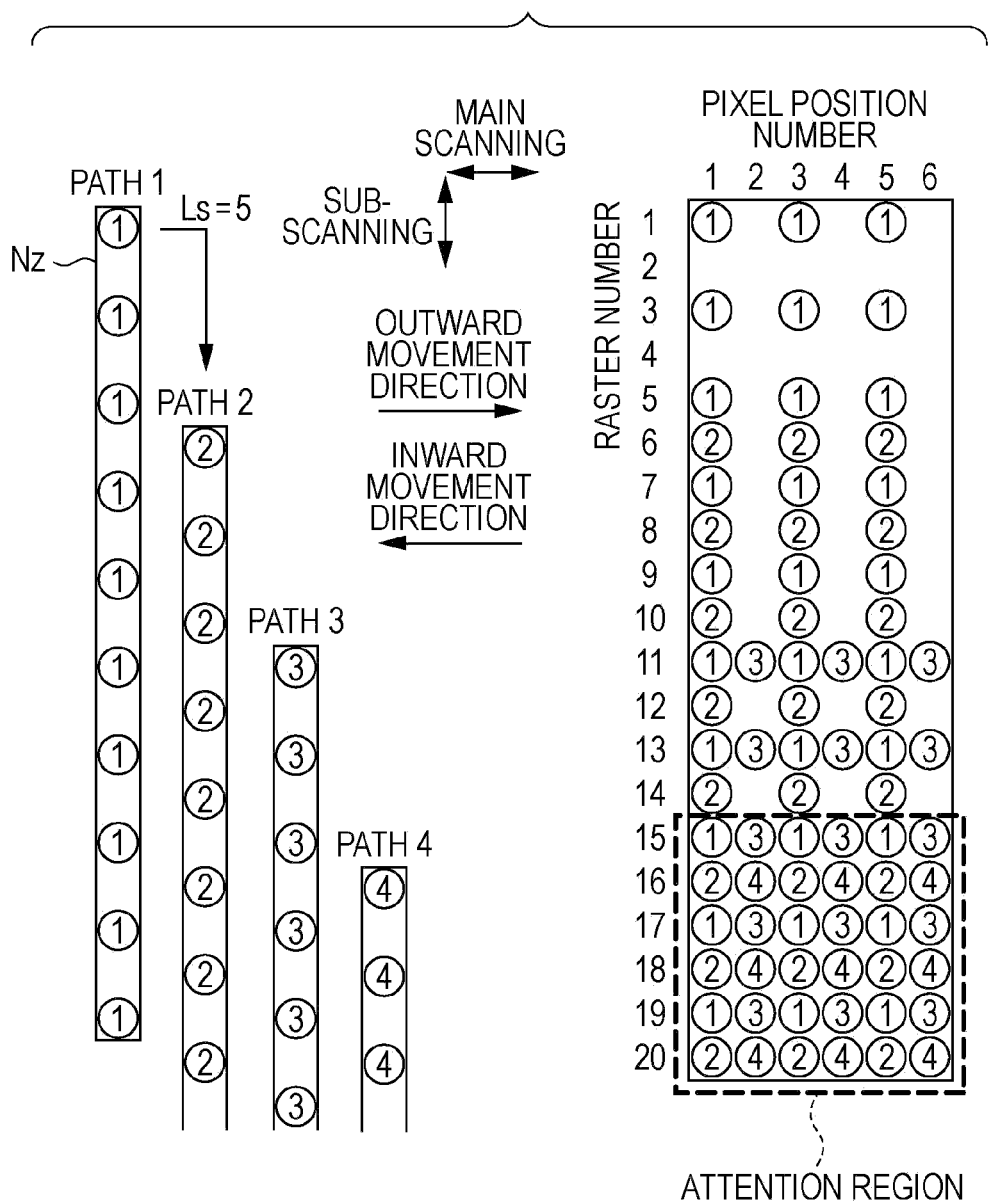
FIG. 3 is a diagram illustrating a dot generation method in the printer.

A dot formation structure in the printing process will be described below with reference to FIG. 3. The printing head 90 in the embodiment includes ten nozzles Nz for each ink color as shown in FIG. 3. The nozzles Nz are arranged in one column with the interval of one nozzle Nz in the sub-scanning direction. Relative positions of the nozzles Nz with respect to a printing medium are shown in the right side of FIG. 3. Although the printing medium is moved in the sub-scanning direction in practice for each main scanning path, FIG. 3 shows the movement of the nozzles Nz. In the embodiment, as shown in FIG. 3, the nozzles Nz are relatively moved by five pixels for each main scanning. In the left side of FIG. 3, pixel positions where dots are formed through each main scanning (path) are denoted by path numbers. In FIG. 3, in order to differentiate the respective main scannings from each other, the main scannings are denoted by a path 1, a path 2, and the like by giving path numbers. An arrangement of dots in the main scanning direction is also referred to as a raster. In FIG. 3, in order to differentiate the respective rasters from each other, a raster number is given to each raster.

The generation of a printing image is performed through printing by so-called interlacing where the printing medium is moved with respect to the printing head 90 having the nozzles Nz for each main scanning, and the main scanning is repeated a plurality of times so as to complete arrangement of dots in the sub-scanning direction. In addition, the generation of a printing image is performed by so-called overlap printing where a single raster is completed through a plurality of main scannings.

Specifically, in the embodiment, as shown in the attention region of FIG. 3, the raster where dots formed in the path 1 and dots formed in the path 3 are alternately arranged and the raster where dots formed in the path 2 and dots formed in the path 4 are alternately arranged are alternately disposed in the sub-scanning direction.

Figure 4A:
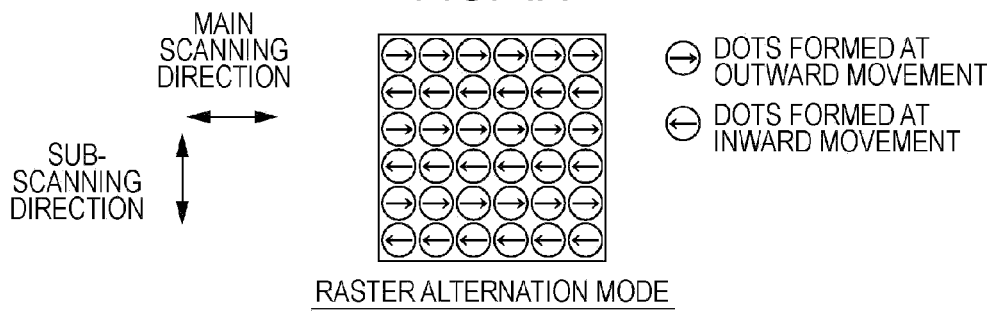
FIGS. 4A to 4C are diagrams illustrating variations of a combination of outward movement dots and inward movement dots.

The path 1 and the path 3 correspond to an outward movement of operations where the printing head 90 is reciprocated as the main scanning. The path 2 and the path 4 correspond to an inward movement of the printing head 90. The dot formed at the outward movement is referred to as an outward movement dot. The dot formed at the inward movement is referred to as an inward movement dot. The arrangement of the dots of the attention region shown in FIG. 3 shows dot disposition shown in FIG. 4A if attention is paid to the outward movement dots and the inward movement dots. As such, all the pixels constituting a single raster are formed by any one of the outward movement dot group and the inward movement dot group, and are formed by the outward movement dot group and the inward movement dot group which are changed with the raster units in the sub-scanning direction. In the embodiment, the interlacing process where a printing image formed by the outward movement dot group and inward movement dot group is output is referred to as a raster alternation mode.

Figure 4B:
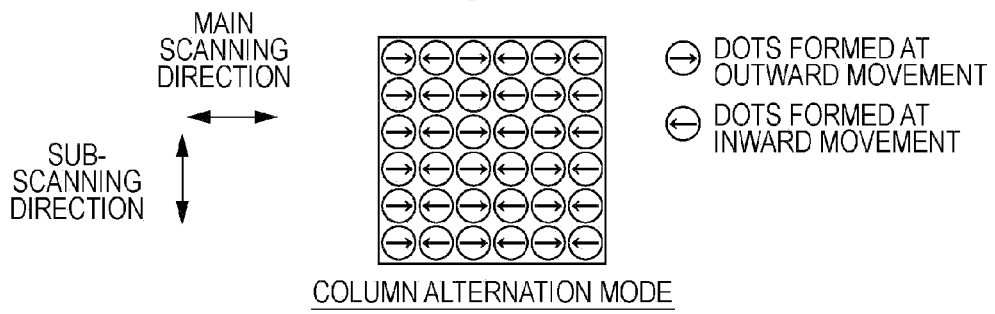
Figure 4C:
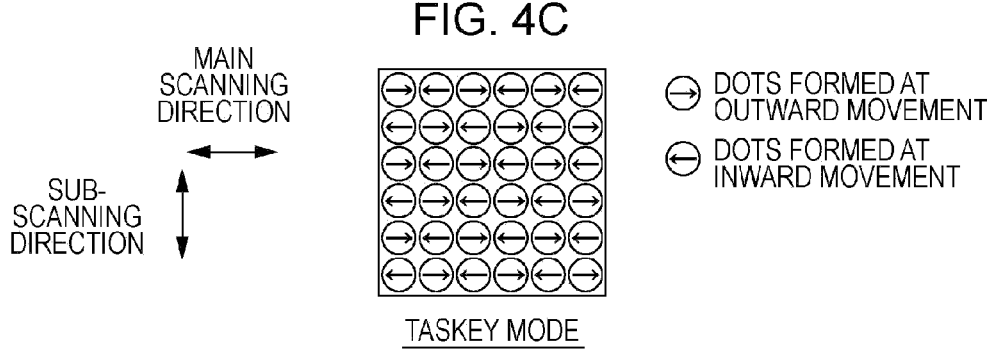

The configuration of the outward movement dot group and the inward movement dot group in the printing image is not limited to the raster alternation mode, and may be realized with various forms depending on specifications of the interlacing process in step S140. For example, as shown in FIG. 4B, there may a form where all the pixels belonging to the same pixel position number are formed by any one of the outward movement dot group and the inward movement dot group, and are formed by the outward movement dot group and the inward movement dot group which are changed with pixel position units in the main scanning direction. The interlacing process where the printing image with such a configuration is output is referred to as a column alternation mode. Alternatively, as shown in FIG. 4C, there may a form where pixels of outward movement dot groups or pixels of inward movement dot groups are alternatively formed in the main scanning direction and sub-scanning direction. The interlacing process where the printing image with such a configuration is output is referred to as a taskey mode.

As is clear from the above description, the printer 20 performs printing through division into a plurality of pixel groups having different printing conditions, and, specifically, a pixel group (hereinafter, referred to as an outward movement pixel group) formed by outward movement dot groups and a pixel group (hereinafter, referred to as an inward movement pixel group) formed by inward movement dot groups. In addition, the pixel groups are formed in a common region, and the dots of the respective pixel groups are combined with each other, thereby printing a single printing image.

A-3. Characteristics of Dither Masks 61 and 62

Figure 5A:
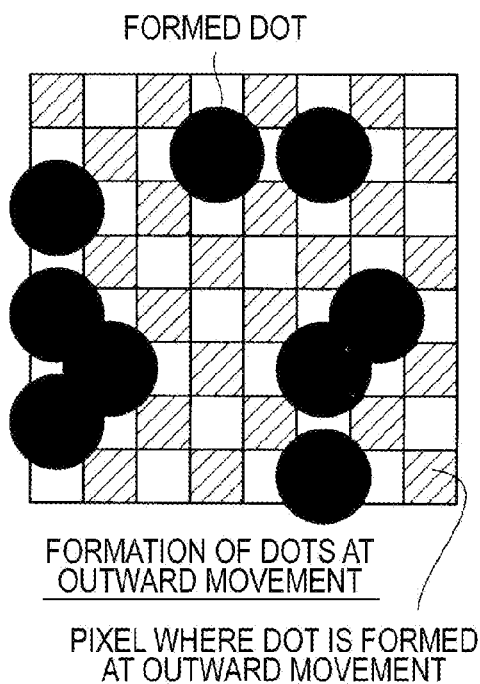
FIGS. 5A to 5C are diagrams illustrating dots formed at the outward movement and inward movement and combinations thereof.
Figure 5B:
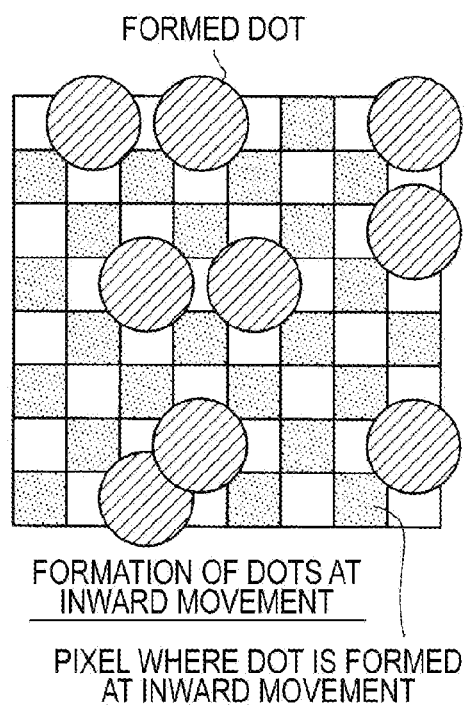
Figure 5C:
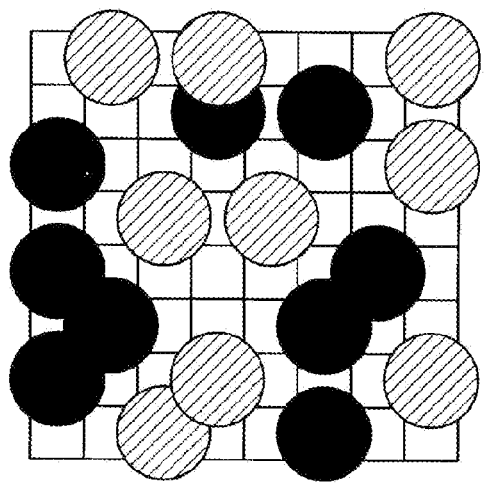

Characteristics of the dither masks 61 and 62 will be described. First, for better understanding of the dither masks 61 and 62, there will be made of a description of influence on a printing image in a case where a relative position of the dot is shifted from a target positional relationship which is a target between an outward movement dot group and an inward movement dot group. In addition, the shift of the target positional relationship is also referred to as a position shift. In a case where the printer 20 performs printing in the taskey mode, dots formed when the printing head 90 is moved outwardly are formed at the pixel positions arranged in a zigzag form as shown by the hatching in FIG. 5A, and, as shown in FIG. 5B, dots formed when the printing head 90 is moved inwardly are formed at the pixel positions which are misaligned with the dot positions at the outward movement by one pixel in the sub-scanning direction as shown by the hatching. In FIGS. 5A and 5B, the dots formed in practice are respectively denoted by the "black circle" mark and the "hatched white circle" mark. As shown in FIG. 5C, the printed image is obtained by combining the outward movement pixel groups with the inward movement pixel groups.

Since printing conditions for dot formations, that is, dot formation timings are different at the outward movement and the inward movement, there are cases where dots formed in practice may be different from those in FIG. 5C. Specifically, there are cases where a relative position of the dot which is a target may be shifted from a target positional relationship between the outward movement dot group and the inward movement dot group due to a problem of operation accuracy of the printing head, a problem of paper feeding accuracy, cockling, and the like. For example, in a case where a dot formation position at the outward movement is shifted from a dot formation position at the inward movement by about one pixel in the main scanning direction, the example shown in FIG. 5C represents dot arrangement shown in FIG. 6A. In a similar manner, if a dot formation position is shifted by about two pixels, it gives dot arrangement shown in FIG. 6B. In addition, such a position shift between the outward movement dot group and the inward movement dot group is also referred to as Bi-D shift.

Figure 6A:
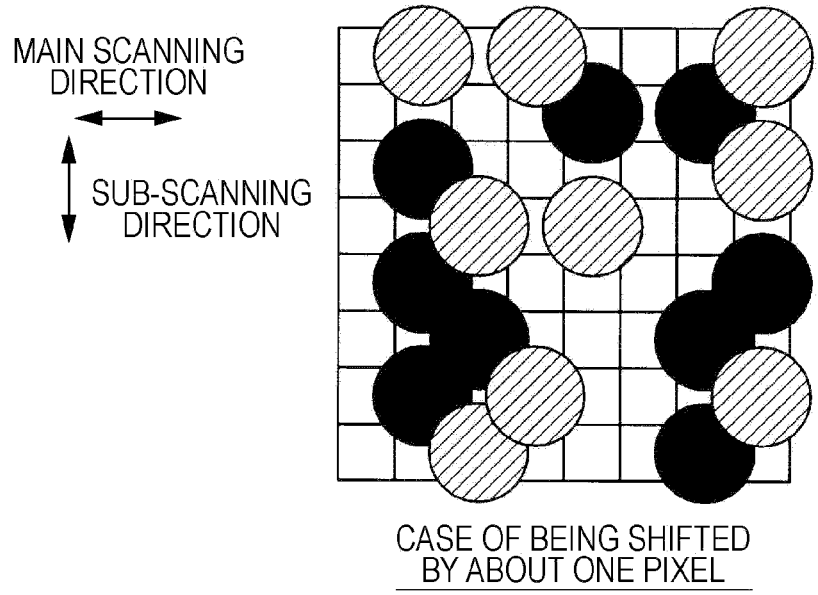
FIGS. 6A and 6B are diagrams illustrating a case where dot formation positions at the outward movement and inward movement are shifted.
Figure 6B:
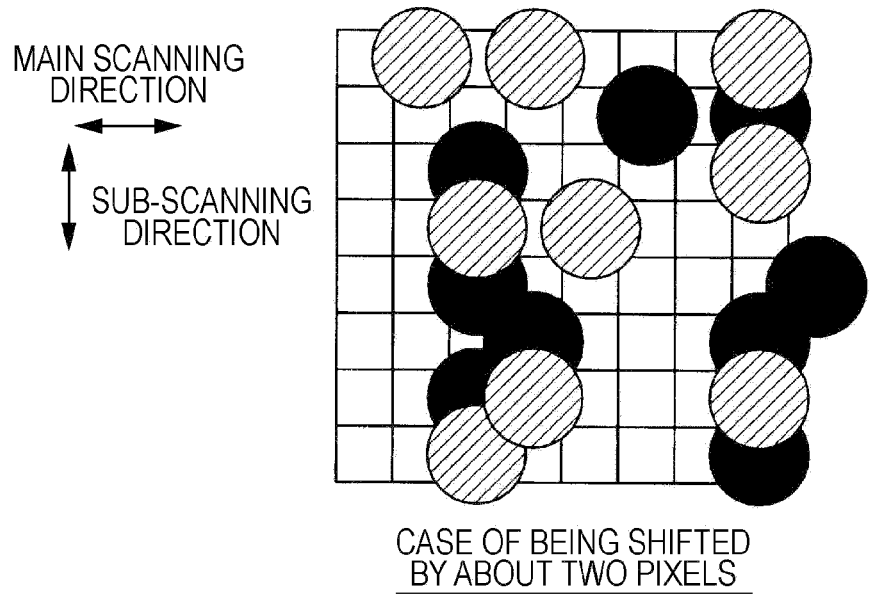

As can be seen from FIG. 5C, if there is no position shift, overlapping of the dots formed as the outward movement pixel group and the dots formed as the inward movement pixel group is very small. This is because dots are disposed as separately from each other as possible in the dither mask having the blue noise characteristic. In contrast, if a position shift occurs in the dot formation position in practical printing, as shown in FIGS. 6A and 6B, an overlapping amount of the dots formed as the outward movement pixel group and the inward movement pixel group is increased, and thus a covering ratio which is a ratio where dots cover the printing medium is decreased. Since a variation in the covering ratio means a variation in the printing density, if the covering ratio is locally varied, there is concern that density unevenness appears in a printing image. In addition, there are cases where dots which are not adjacent if there is no shift in a dot formation position may be formed so as to be adjacent to each other due to the shift in the dot formation position. In a typical ink jet printer, since a dot size is set to be equal to or more than a diagonal size of the pixel in order to realize a maximum of 100% even if more or less position shift occurs, if the dots are adjacent to each other, dot peripheries overlap each other, and thus the covering ratio is reduced. That is to say, in a case where dots are formed so as not to be adjacent to each other and in a case where dots are formed so as to be adjacent to each other, the covering ratio is reduced in the case where the dots are formed so as to be adjacent to each other.

Figure 7A:
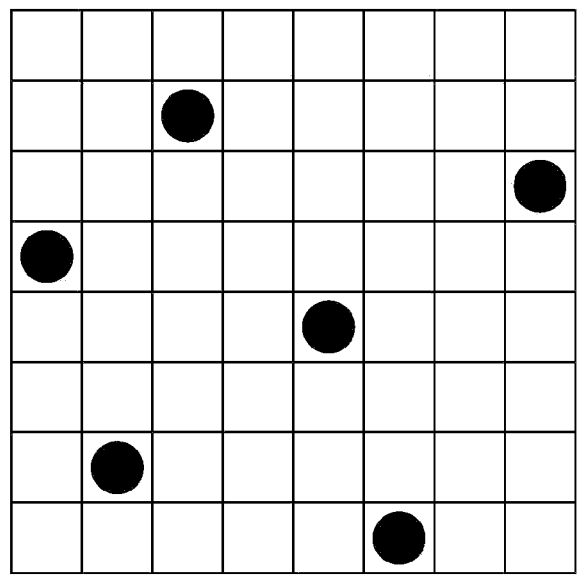
FIGS. 7A and 7B are diagrams illustrating dot disposition examples and dot pairs when a dispersion type dither mask is used.

Characteristics of the dither masks 61 and 62 will be described based on the above description. Since the dither mask 61 has the blue noise characteristics as described above and is thus set to high dot dispersibility, dots are sparsely disposed in a region having low image density. From the viewpoint of dot dispersibility, dots are hardly disposed at two pixels which are adjacent to each other in the vertical direction or horizontal direction. This form is shown in FIG. 7A. FIG. 7A shows an 8×8 region as an example, and exemplifies a case where grayscale values of an image are uniformly 26/255. In this case, dots are formed at about 10% of pixels, that is, about six pixels in the 8×8 region.

Figure 7B:
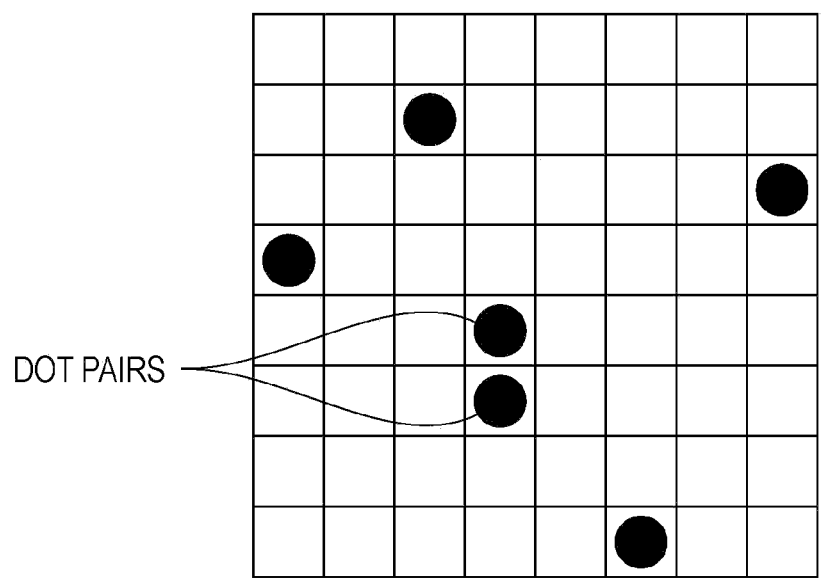

In contrast, in the dither mask 62, threshold values are set such that dots are disposed at adjacent pixels with significant probability. FIG. 7B shows an example where dots (hereinafter, referred to as dot pairs) which are all formed at adjacent pixel are formed. In the dither mask 62, threshold values are set such that a state where dots are all formed at the adjacent pixels is generated with a significance ratio even in a grayscale region (for example, a region of which a grayscale value is 25 to 127/255) including such a region, having a relatively low image grayscale value, where dot pairs are not generated in a typical dither mask having the blue noise characteristic.

This significance probability will be described. A ratio where dot pairs are formed is schematically shown in FIG. 8. In FIG. 8, the transverse axis expresses a ratio k where dots are formed at pixels. In addition, the longitudinal axis of FIG. 8 expresses probability K where dot pairs are formed (hereinafter, also referred to as dot pair generation ratio K). In FIG. 8, the dot chain line BN1 indicates a case where a halftone process is performed using the dither mask 61, and the solid line JD1 indicates a case where the halftone process is performed using the dither mask 62. In addition, the broke line WN1 indicates a case where the halftone process is performed by a random dithering method, or a dithering method using a dither mask which has random threshold values, a sufficiently large size, and a white noise characteristic (hereinafter, referred to as a white noise mask). The blue noise characteristic does not include a low frequency component, whereas the white noise characteristic all the components from a low frequency component to a high frequency component.

As shown in the figure, in a case of using the dither mask 61 having the typical blue noise characteristic, dot pairs are hardly formed in regions (grayscale value of 0 to 51, and the dot generation ratio k=0 to 0.2) having a low image grayscale value. This is because dot dispersibility is prioritized in the low density regions in the dither mask 61, and the dot pair generation ratio K can be close to 0. In contrast, in a case of using the random dithering method or the white noise mask, the dot pair generation ratio K nearly corresponds with $k^2$ relative to the dot formation ratio k since a property thereof is random regardless of the dot formation result between two adjacent pixels.

With respect to the characteristics, in the dither mask 62, the dot pair generation ratio K is located between the dither mask 61 (the dot chain line BN1) and the white noise mask (the broken line WN1) as indicated by the solid line JD1. In other words, the dither mask 62 shows dispersibility close to the blue noise mask in relation to distribution of formed dots, and shows a characteristic swung to the white noise mask.

The dither masks 61 and 62 having the characteristics have the following different characteristics from the viewpoint of the covering ratio. The dither mask 61 is set to high dot dispersibility, and thus threshold values are set such that the dot dispersibility is optimum in a case where a position shift does not occur. Therefore, if a case where there is no position shift and a case where a position shift occurs by an arbitrary amount in an arbitrary direction are considered, the covering ratio becomes the maximum in the case where there is no position shift. However, circumstances where there is no position shift in practice are difficult to assume, and the dot dispersibility is deteriorated and thus dot overlapping easily occurs if there is any position shift in the dither mask 61.

On the other hand, in the dither mask 62, the covering ratio does not become the maximum in a case where there is no position shift due to a generation method described later. That is to say, in a case where there is no position shift, the covering ratio in the dither mask 62 is smaller than that in the dither mask 61. In other words, threshold values are set such that the dot dispersibility is the optimum in a case where a position shift occurs to a predetermined extent. Therefore, a dot formation pattern by the dither mask 62 is smaller in a variation with of the covering ratio in a case where a position shift occurs than a dot formation pattern by the dither mask 61.

In addition, if attention is paid to dot pairs, in most cases, the covering ratio in the dither mask 61 is larger in a case where dots are formed without a position shift than in a case where a position shift occurs. That is to say the dither mask 61 is set such that dot pairs are hardly generated. On the other hand, the dither mask 62 is set such that the generation probability of dot pairs is larger than in the dither mask 61. The dot pairs cause dot overlapping if the extension of landed ink is considered. For this reason, it can also be grasped that the dither mask 62 has higher dot pair generation ratio than the dither mask 61, and thus is set to have a smaller covering ratio than the dither mask 61. As such, the dither mask 62 is controlled in advance such that the covering ratio is smaller by a predetermined extent, and thus a variation width of the covering ratio can be reduced in a case where the covering ratio is varied due to a position shift. The closer to $k^2$ the dot pair generation ratio K is, the smaller such a variation width of the covering ratio is. The characteristics of the dither mask 62 are realized according to a generation method of the dither mask 62 described below.

A-4. Generation Method of Dither Masks 61 and 62

A generation method of the above-described dither masks 61 and 62 will be described. The dither masks 61 and 62 have storage elements corresponding to their sizes (the number of threshold values). In the embodiment, the size of the dither mask 61 is the same as the size of the dither mask 62. The storage element refers to an element storing a threshold value forming the dither masks 61 and 62. A threshold value is stored in each storage element, thereby generating the dither masks 61 and 62. The dither mask 61 is a dither mask which is generated in the course of generation of the dither mask 62. The generation method described in the following is a process where a CPU such as a main frame generates the dither masks 61 and 62. A part of or all of the steps described in the following may be manually calculated by a user.

The size of the dither masks 61 and 62 may be, for example, 256 pixels×256 pixels, 512 pixels×512 pixels, or the like, and, in the following description, the size of the dither masks 61 and 62 is a size applied to image data of five pixels in both the vertical direction and horizontal direction, that is, a total of 25 pixels (=5×5).

Figure 9:
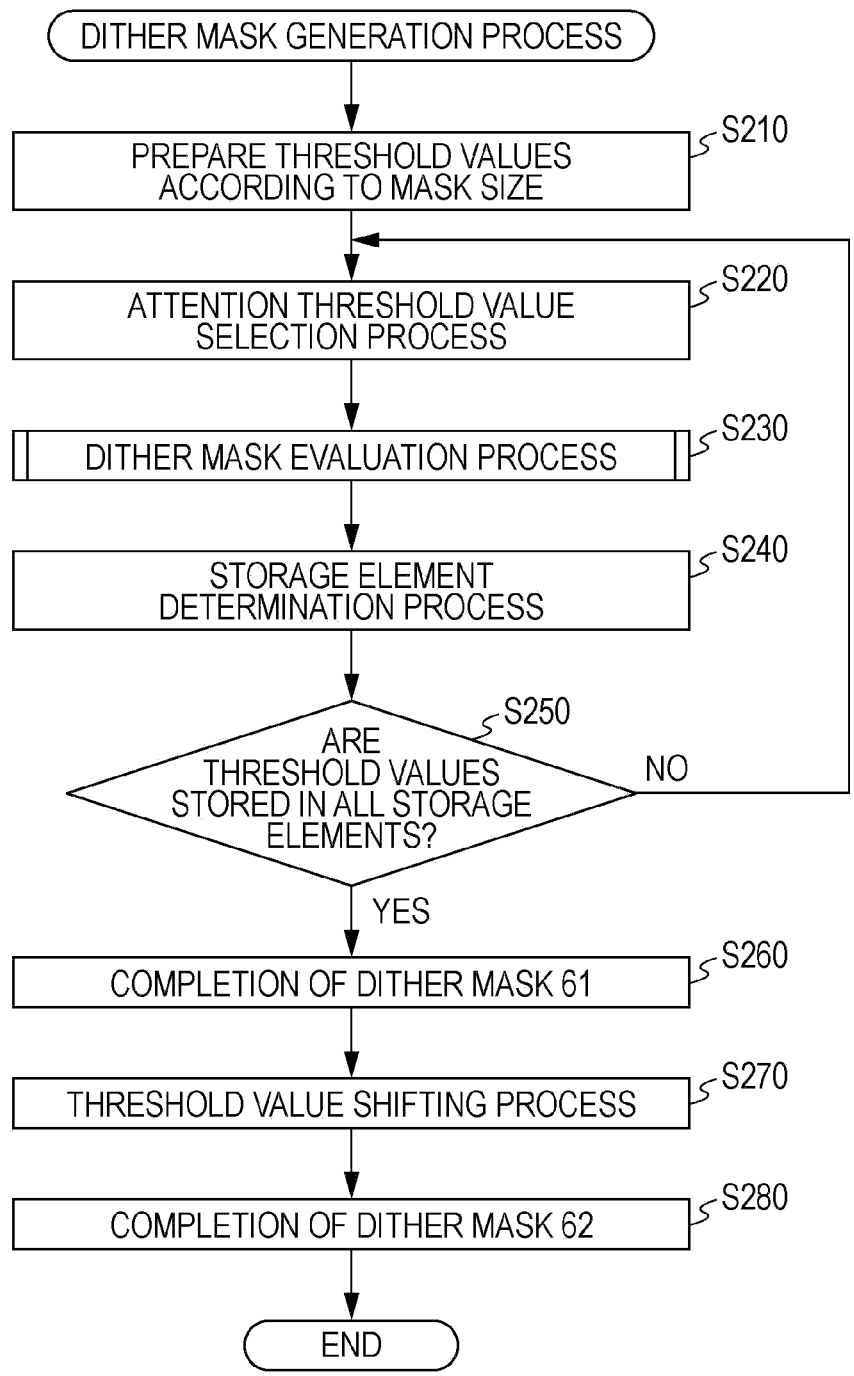
FIG. 9 is a flowchart illustrating a generation method of the dither masks used for the halftone process performed by the printer.

FIG. 9 is a flowchart illustrating procedures of the generation method of the dither masks 61 and 62. In the generation of the dither masks 61 and 62, as shown in the figure, first, threshold values corresponding to the size of the dither masks 61 and 62 are prepared (step S210). In the embodiment, each of the dither masks 61 and 62 has twenty-five storage elements, and thus threshold values of 0 to 24 corresponding thereto are prepared.

Figure 11:
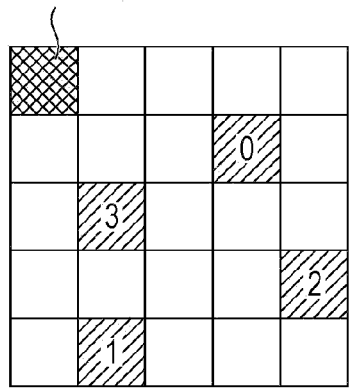
FIG. 11 is a diagram illustrating a state and the like where threshold values are stored in a part of the storage element of the dither masks.

After the threshold values are prepared, an attention threshold value selection process is performed (step S220). The threshold value selection process is a process where a threshold value is selected as an attention threshold value from threshold values which have not yet been stored in the storage elements of the prepared threshold values of 0 to 24. In the embodiment, it is assumed that an attention threshold value is sequentially selected from a smaller threshold value of the prepared threshold values. As shown in FIG. 11, in a case where the threshold values of 0 to 3 are stored in the storage elements forming the dither masks 61 and 62 in advance according to steps described later, a next selected attention threshold value in step S220 is 4.

After the attention threshold value is selected, a dither mask evaluation process is performed (step S230). The dither mask evaluation process is a process where an evaluation value E indicating of a dot dispersion extent with respect to a dot formation pattern indicated by disposition of the storage elements (hereinafter, referred to as determined storage elements) in which the threshold values have already been stored in a case where an attention threshold value is stored in one of the storage elements (hereinafter, referred to as vacant storage elements) in which the prepared threshold values have not yet been stored, is calculated for each of the vacant storage elements.

In the embodiment, the smaller a value of the evaluation value E is, the more favorable the dot dispersibility is, and it can be said to be excellent from the viewpoint of graininess of a printing image. In addition, in the halftone process, since a dot has an ON state at a pixel where a threshold value of the dither masks 61 and 62 is smaller than an input threshold value, if grayscale values gradually become larger in a case where a solid image where grayscale values of all the pixels are the same is input, a dot formation pattern according to disposition of the threshold values in the dither masks 61 and 62 is shown. In the embodiment, dot shapes based on such a dot generation characteristic are referred to as a dot formation pattern.

Figure 10:
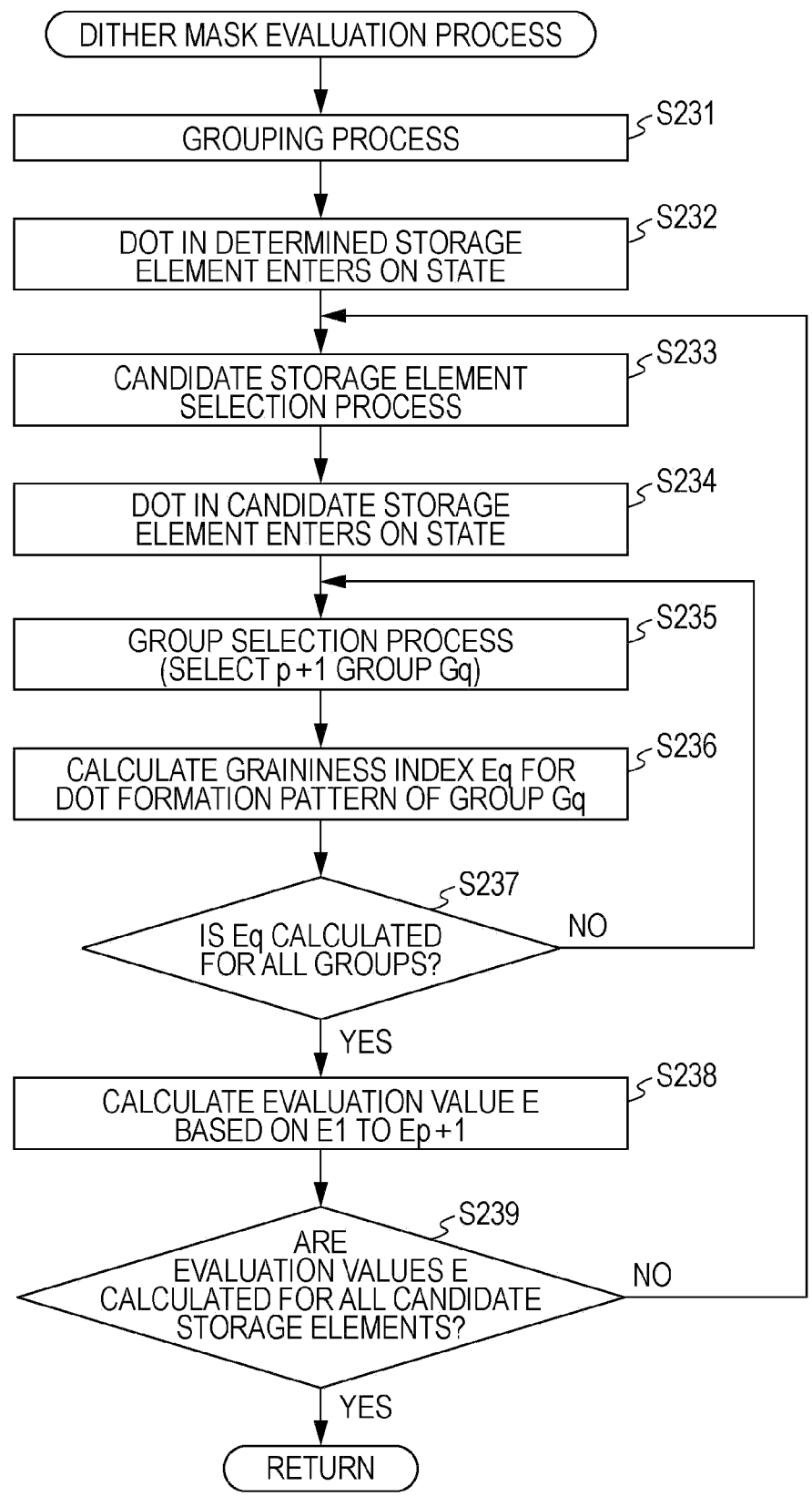
FIG. 10 is a flowchart illustrating a dither mask evaluation process in the dither mask generation method.

The dither mask evaluation process will be described in detail with reference to FIG. 10. In the dither mask evaluation process, as shown in FIG. 10, first, a grouping process is performed (step S231). The grouping process is a process where a plurality of storage elements forming the dither masks 61 and 62 are divided into a plurality of groups by paying attention to whether dots at dot formation positions where the threshold values stored in the plurality of storage elements are applied in the halftone process are formed at the outward movement or at the inward movement. That is to say, groups of the storage elements are set based on a form of the disposition of the above-described outward movement dots and inward movement dots. For example, in a case of employing the column alternation mode, the storage elements are divided into groups of a pattern which is the same as the pattern indicated by the outward movement pixel group and the inward movement pixel group shown in FIG. 4B.

After the grouping process is performed in this way, dots in the determined storage elements enter an ON state (step S232). In FIG. 11, a form where the dots in the determined storage elements storing the threshold values of 0 to 3 have an ON state is indicated by single hatching. After the dots in the determined storage elements have an ON state, a candidate storage element selection process is performed (step S233). The candidate storage element selection process is a process of selecting a candidate storage element which is a candidate of a storage element in which an attention threshold value is to be stored. Since an attention threshold value can be stored in each of the vacant storage elements, here, one of the vacant storage elements is selected as a candidate storage element. After the candidate storage element selection process is performed, a dot in the candidate storage element enters an ON state (step S234). In FIG. 11, a form where one of the vacant storage elements is selected as a candidate storage element and a dot in the candidate storage element enters an ON state is indicated by cross hatching.

After the dot in the candidate storage element enters an ON state, a group selection process is performed (step S235). The group selection process is a process where a group Gq (where q is an integer which is equal to or more than 1 and equal to or less than p+1) is selected from p (where p is an integer equal to or more than 2, and, here, p=2) G1 to Gp set in step S231 and the group Gp+1 which is a group including all the storage elements forming the dither masks 61 and 62.

Figure 12:
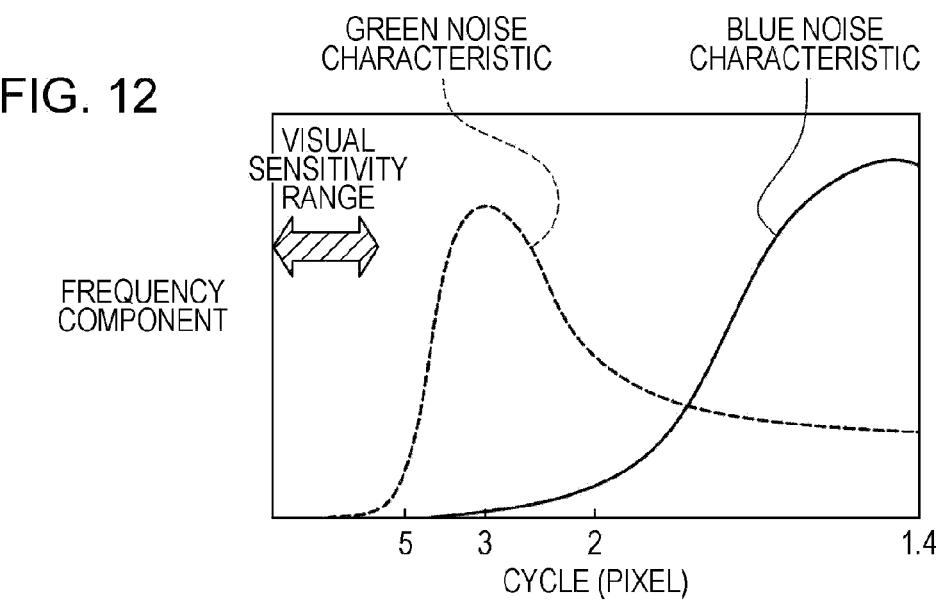
FIG. 12 is a diagram illustrating a blue noise characteristic and a green noise characteristic.

After the group Gq is selected, an evaluation value Eq indicating a dot dispersion extent, that is, an evaluation value indicating to what extent dots are formed in a uniformly dispersed state is calculated based on a dot formation pattern corresponding to the storage elements included in the group Gq (step S236). In order to form dots in a uniformly dispersed state, it is known that a dither mask having the blue noise characteristic, shown in FIG. 12, is preferably generated. The blue noise characteristic is a noise characteristic having a peak on the high frequency side in the spatial frequency region. In relation to the human visual characteristics, since sensitivity to high frequency of 10 cycle/mm or more is nearly close to zero in a case of an observation distance is 30 cm, if a peak can be given to a region equal to or more than that, a dither mask with favorable graininess can be generated. In the embodiment, in order to generate a dither mask with such characteristics, a graininess index is used as an evaluation value indicating the dot dispersibility extent.

Figure 13:
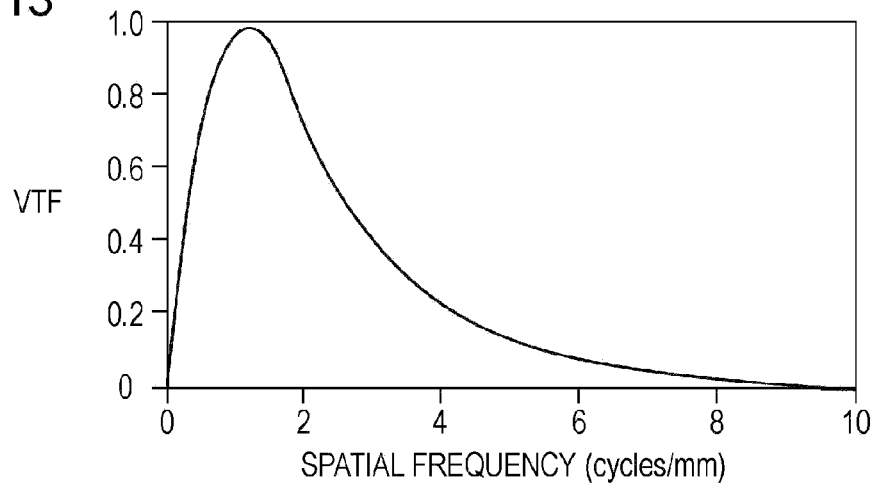
FIG. 13 is a diagram illustrating an example of the sensitivity characteristics which is a base of calculation of the evaluation value.

Since the graininess index is a well-known technique (for example, JP-A-2007-15359), detailed description thereof will be omitted but is an index which is obtained by obtaining a power spectrum FS through the Fourier transform of an image, giving a weight corresponding to a human visual sensitivity characteristic VTF (Visual Transfer Function) with respect to spatial frequencies, and integrating the obtained power spectrum FS with each spatial frequency. FIG. 13 shows an example of the VTF. As equations which give the VTF, various equations are proposed, but a representative equation is shown in the following Equation (1). The variable L denotes an observation distance, and the variable u denotes a spatial frequency. The graininess index can be calculated using a calculation equation shown in the following Equation (2) based on the VTF. The coefficient K is a coefficient for matching the obtained value with human senses. In addition, as is clear from the calculation method, the graininess index can be said to be an index indicating whether or not the dots can be perceived visually. Since it is difficult for the dots to become visible as a value of the graininess index becomes smaller, it can be said that the graininess index is excellent from this viewpoint.

[Equation 1]

$$VTF(u) = 5.05 \cdot \exp\left(\frac{-0.138\pi L \cdot u}{180}\right) \cdot \left\{1 - \exp\left(\frac{-0.1\pi L \cdot u}{180}\right)\right\} \quad (1)$$

[Equation 2]

$$\text{Graininess index} = K \int FS(u) \cdot VTF(u) du \quad (2)$$

$FS(u)$: Power spectrum
$K$: coefficient

After the evaluation value Eq is calculated, the processes in steps S235 and S236 are repeatedly performed until evaluation values Eq for all the groups G1 to Gp+1 (here, G1 to G3) are calculated (step S237). If the evaluation values Eq (E1 to E3) for all the groups G1 to G3 are calculated (step S237: YES), the evaluation value E is calculated using the following Equation (3) based on the calculated evaluation values E1 to E3 (step S238). In Equation (3), a to c are weighting coefficients. The weighting coefficients are constant values and are experimentally determined so as to obtain favorable printing image quality. That is to say, the evaluation value E is an evaluation value for comprehensively evaluating the dot dispersibility extent with predetermined weighting in relation to a dot formation pattern indicated by the overall determined storage elements of the dither masks 61 and 62, each dot formation pattern indicated by a determined storage element corresponding to the outward movement, and a dot formation pattern indicated by a determined storage element corresponding to the inward movement.

$$E = a \times E1 + b \times E2 + c \times E3 \quad (3)$$

After the evaluation value E is calculated, the processes in steps S233 to S238 are repeatedly performed until evaluation values E for all the candidate storage elements (vacant storage elements) are calculated (step S239). If the evaluation values E for all the candidate storage elements are calculated (step S239: YES) are calculated in this way, the dither mask evaluation process is finished.

Here, the description will be made with reference to FIG. 9 again. After the dither mask evaluation process is performed, a storage element determination process is performed (step S240). The storage element determination process here is a process of determining a vacant storage element storing an attention threshold value based on the evaluation value E calculated in the dither mask evaluation process. Specifically, a candidate storage element corresponding to the smallest evaluation value E of the evaluation values E calculated for the respective candidate storage elements (vacant storage elements) is determined as a candidate storage element storing an attention threshold value, and an attention threshold value is stored in the storage element.

After the storage element determination process is performed, the processes in steps S220 to S240 are repeatedly performed until the threshold values prepared in step S210 are stored in all the storage elements forming the dither masks 61 and 62 (step S250). If the threshold values are stored in all the storage elements in this way (step S250: YES), the dither mask 61 is first completed (step S260).

The dither mask 61 generated using the above-described evaluation values E is generated such that a dot formation pattern where it is difficult for dots to be visible is caused by the weighting corresponding to the human visual sensitivity characteristic VTF with respect to the spatial frequency. Therefore, the dot formation pattern caused by the dither mask 61 resultantly has a noise characteristic where distribution of the dots has a peak on the high frequency side in the spatial frequency region. In other words, the dot formation pattern caused by the dither mask 61 has the blue noise characteristic. Therefore, in a printing image which is printed by the halftone process using the dither mask 61, the dots are favorably dispersed, and thus it is possible to obtain smooth printing image quality where it is difficult for the dots to be visible.

In addition, if the above-described evaluation values E are used, it is possible to generated the dither mask 61 having a dot formation pattern where dots are dispersed and disposed in any of the outward movement dots, the inward movement dots, and the entire printing image where the outward movement dots and the inward movement dots are combined with each other. If the halftone process is performed using the dither mask 61, since dispersibility of the outward movement dots and the inward movement dots is secured even if a position shift occurs between the outward movement dots and the inward movement dots, dot dispersibility in the entire image is secured, and thus it is possible to suppress graininess of printing image quality from being deteriorated.

After the dither mask 61 is completed in this way, a threshold value shifting process is performed (step S270). The threshold value shifting process is a process of shifting threshold values corresponding to a part of groups of the groups set in step S231 by predetermined pixels in a predetermined direction with respect to the threshold value disposition of the dither mask 61. The dither mask 62 is completed through such a threshold value shifting process (step S280). In this way, the dither mask generation process is finished. In addition, steps S210 to S250 correspond to the first threshold value disposition process in the claim. Step S270 corresponds to a second threshold value disposition process in the claim. Further, the threshold value disposition of the dither mask 61 corresponds to the first threshold value disposition in the claim. The threshold value disposition of the dither mask 62 corresponds to the second threshold value disposition in the claim.

Figure 14:
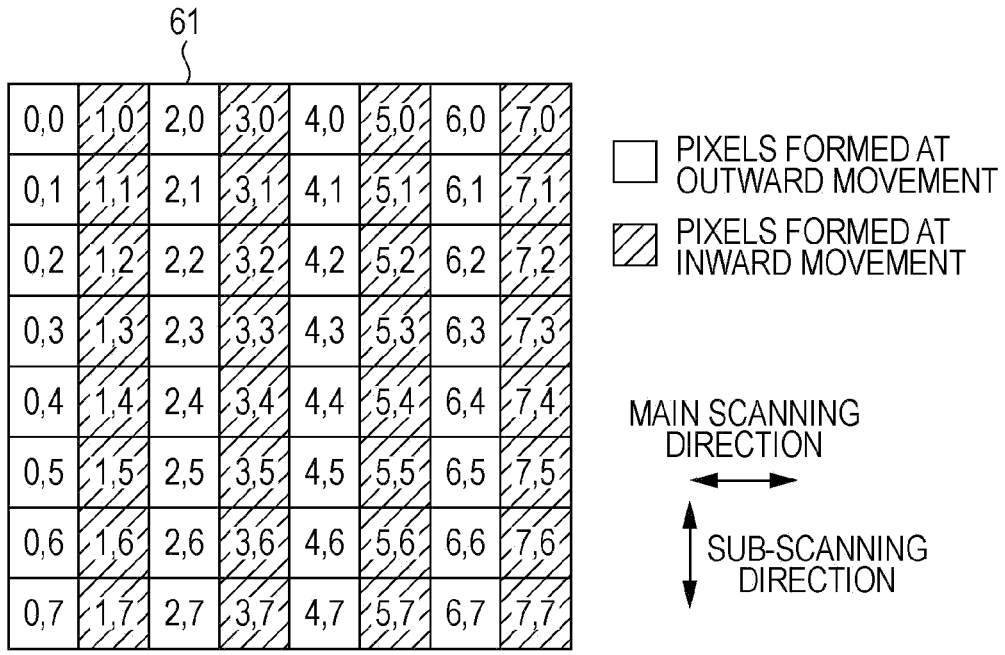
FIG. 14 is a diagram illustrating threshold value disposition of the dither mask.

The threshold value shifting process will be described in detail below. FIG. 14 shows threshold value disposition of the dither mask 61. The dither mask 61 is a dither mask where the dot dispersibility is the optimum according to the above-described method, and is also referred to as a dispersibility optimum dither mask. FIG. 14 shows threshold value disposition of the dither mask having the size of 7×7 pixels. In order to differentiate threshold values of the respective pixels from each other, numbers such as "0,1" are given to each threshold value in the figure. For example, the threshold value "0,1" indicates a zeroth threshold value in the main scanning direction (rightward in the figure) and a first threshold value in the sub-scanning direction (downward in the figure). The threshold values forming the dither mask 61 are differentiated into threshold values (hereinafter, referred to as outward movement threshold values) applied to pixels where dots are formed at the outward movement and threshold values (hereinafter, referred to as inward movement threshold values) applied to pixels where dots are formed at the inward movement. The inward movement threshold values are shown by hatching in FIG. 14. The shown threshold value disposition of the dither mask 61 corresponds to a case of using the column alternation mode.

Figure 15:
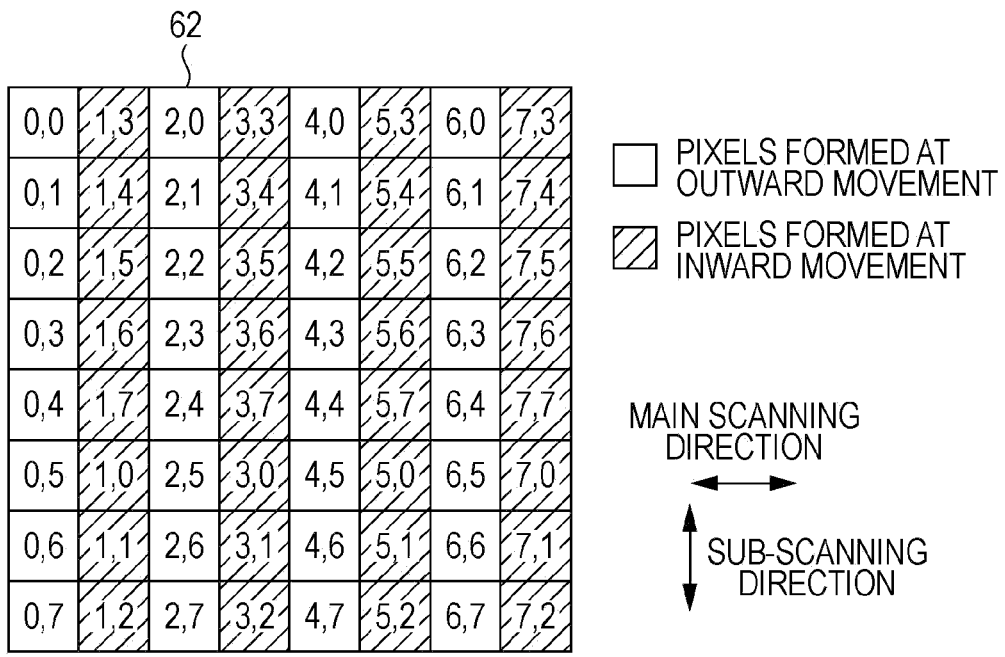
FIG. 15 is a diagram illustrating a first example of the threshold value disposition of the dither mask.

A detailed example of the threshold value disposition of the dither mask 62, generated through the threshold value shifting process for such threshold value disposition of the dither mask 61, is shown in FIG. 15. As shown in the figure, the threshold value disposition of the dither mask 62 has a threshold value disposition where only the inward movement threshold values are shifted by three pixels in the sub-scanning direction (upward in the figure) of the outward movement threshold values and the inward movement threshold values of the dither mask 61. For this reason, the dither mask 62 is also referred to as a shifted dither mask. In addition, since the dither mask 62 is repeatedly applied in the main scanning direction and the sub-scanning direction, if the inward movement threshold values are shifted by three pixels, for example, the threshold values "1,0", "1,1" and "1,2" are disposed under the threshold value "1,7".

Figure 16:
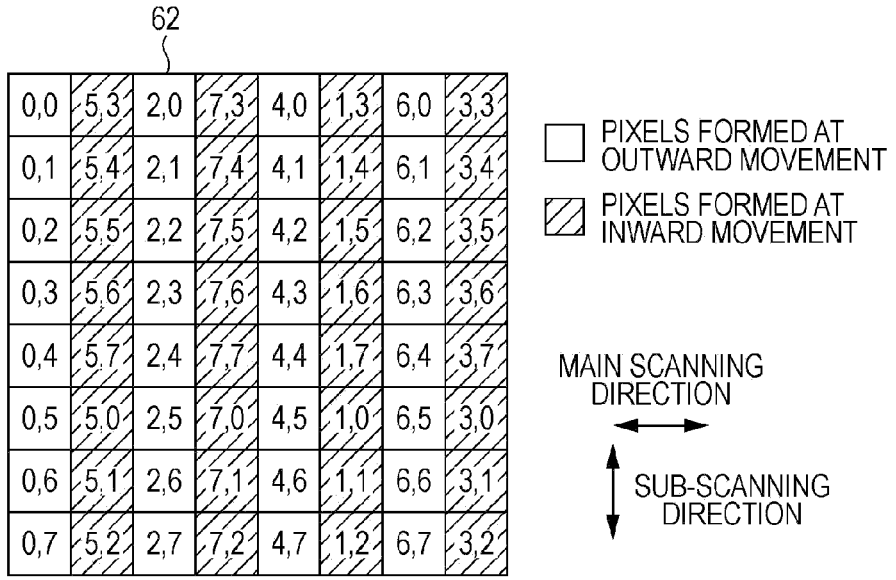
FIG. 16 is a diagram illustrating a second example of the threshold value disposition of the dither mask.

FIG. 16 shows another example of the threshold value disposition of the dither mask 62. In this example, as shown in the figure, the threshold value disposition of the dither mask 62 has a threshold value disposition where only the inward movement threshold values of the dither mask 61 are shifted by four pixels in the main scanning direction (leftward in the figure) and are shifted by three pixels in the sub-scanning direction (upward in the figure).

Figure 17:
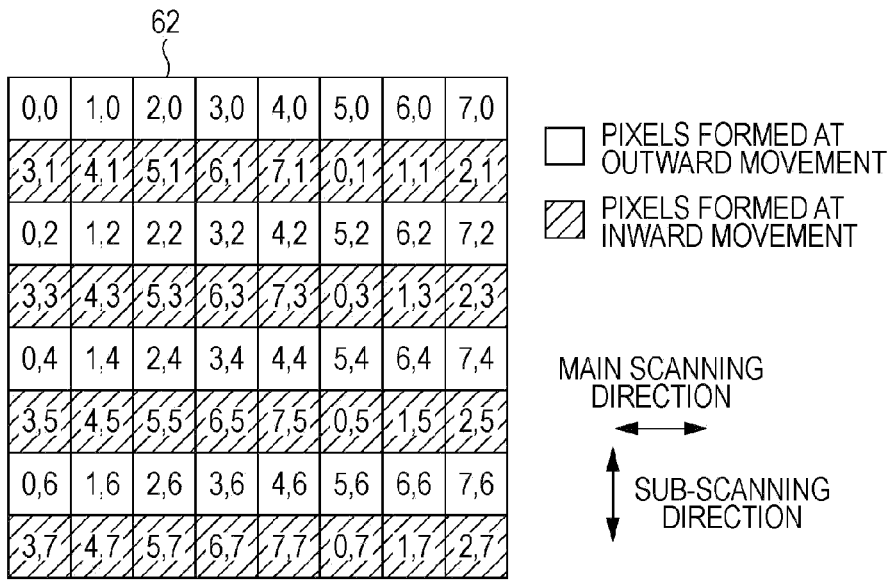
FIG. 17 is a diagram illustrating a third example of the threshold value disposition of the dither mask.
Figures 18, 19:
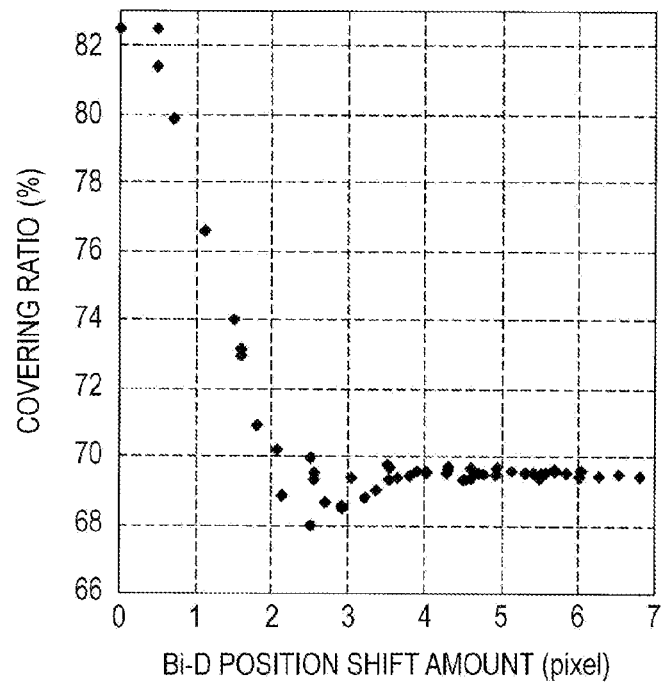
FIG. 18 is a diagram illustrating a fourth example of the threshold value disposition of the dither mask.
FIG. 19 is a diagram illustrating effects achieved by the printer.

The threshold value shifting process is the same method as in the above-described column alternation mode, and can be applied to the raster alternation mode or the taskey mode. FIG. 17 shows an example of the threshold value disposition of the dither mask 62 in a case of employing the raster alternation mode. In the shown example, the inward movement threshold values of the dither mask 61 are shifted by three pixels in the main scanning direction (leftward in the figure). In addition, FIG. 18 shows an example of the threshold value disposition of the dither mask 62 in a case of employing the taskey mode. In the shown example, the inward movement threshold values of the dither mask 61 are shifted by four pixels in the main scanning direction (leftward in the figure).

As described above, in the threshold value shifting process, a direction where the threshold values are shifted may be the main scanning direction or the sub-scanning direction. Of course, a direction may be the main scanning direction and the sub-scanning direction. In addition, a shifted threshold value is not limited to the inward movement threshold value but may be the outward movement threshold value. Through such a threshold value shifting process, the characteristics of the dither mask 62 are varied in a direction deteriorating dot dispersibility as compared with the dither mask 61. This means that the dot pair generation ratio K becomes larger than in the dither mask 61. In other words, the characteristics of the dither mask 62 shown in FIG. 8 can be obtained.

A threshold value shift amount in each direction may be appropriately set, and is preferably set as follows. If characteristics of the blue noise mask are searched, in a case where relative positions of two in a dither mask are close to each other, there is a strong correlation between ON and OFF of dots at the two pixels. That is to say, if a dot of one pixel of the two pixels enters an ON state, probability that a dot of the other pixel enters an ON state is very low. On the other hand, in a case where two pixels are sufficiently separated from each other, there is little correlation between ON and OFF of dots at the two pixels. If a relative position between the two pixels becomes large, the probability that both the dots of the two pixels enter an ON state, that is, the dot pair generation ratio K converges on $k^2$ (where k is a dot generation ratio) in the same manner as the white noise shown in FIG. 8.

In relation to a relationship between the relative position between two pixels and the dot pair generation ratio K, it was confirmed that the dot pair generation ratio K was nearly converged into $k^2$ if the relative position between two pixels becomes large to an extent of five or more pixels in printing grayscales where density variation is problematic due to the position shift, that is, in a range from a low grayscale to an intermediate grayscale (for example, 25 to 127/255). This means that, if a threshold value shift amount is five or more pixels, the dot pair generation ratio K nearly converges on $k^2$. On the other hand, a threshold value shift amount is preferably small in order to secure favorable dot dispersibility of the dither mask 62. This is because dot graininess optimized as the dither mask 61 is deteriorated as a threshold value shift amount becomes larger.

For this reason, a threshold value shift amount is preferably set as an upper limit value obtained by adding a predicted position shift amount to a value (in the above-described example, five pixels) where the dot pair generation ratio K nearly converges on $k^2$. For example, in a case where a position shift which occurs in practice is predicted as ±2 pixels, a threshold value shift amount is preferably seven pixels as an upper limit value. In this case, for example, a threshold value shift amount may be five pixels. In this way, a substantial threshold value shift amount when a position shift of ±2 pixels occurs is in a range of three pixels to seven pixels, and thus it is possible to suppress the dot graininess from being deteriorated and favorably make the dot pair generation ratio K to reach $k^2$. However, in a case where a predicted position shift amount is much larger, it is necessary to make a threshold value shift amount much larger. For example, this is because, if a practical position shift amount is −5 pixels, a substantial threshold value shift amount is 0 pixels even if a threshold value shift amount is 5 pixels.

In addition, a threshold value shift amount is preferably set in consideration of singularity of the position shift of the printer 20. Specifically, in a case where the position shift of the printer 20 easily occurs in a specific direction, a shift amount in a direction different from the specific direction is preferably set to be larger than the shift amount in the specific direction. In the embodiment, the printer 20 is a serial printer, and thus a position shift between the outward movement dot and the inward movement dot easily occurs in the main scanning direction. Therefore, a shift amount in the sub-scanning direction is preferably larger than that in the main scanning direction. In this way, a variation range of the sum of a threshold value shift amount and a practical position shift amount, that is, a substantial threshold value shift range is close to a case where there is no position shift, and thus the dot dispersion characteristic is stabilized. In addition, the threshold value shift amount can be made to be small.

For example, it is assumed that a position shift of ±2 pixels in the main scanning direction occurs. As a first case, if a threshold value shift amount is six pixels in the main scanning direction and 0 pixels in the sub-scanning direction, a variation range of the sum of the threshold value shift amount and a practical position shift amount is a range of four to eight pixels in the main scanning direction and 0 pixels in the sub-scanning direction. On the other hand, as a second case, if a threshold value shift amount is 0 pixels in the main scanning direction and four pixels in the sub-scanning direction, a variation range of the sum of the threshold value shift amount and a practical position shift amount is a range of −2 to 2 pixels in the main scanning direction and four pixels in the sub-scanning direction. Upon comparison of the first case with the second case, the second case has a smaller shift amount and further suppresses deterioration in graininess. In addition, both of the case 1 and the case 2 secure four or more pixels in the substantial threshold value shift amounts. From the above description, in a case where a position shift easily occurs in the main scanning direction, a shift amount in the sub-scanning direction is preferably larger than that in the main scanning direction.

A-5. Effects

The printer 20 with this configuration performs printing according to dot data generated by the dither mask 62 where threshold values corresponding to a part of groups of the outward movement pixel groups and the inward movement pixel groups are shifted by predetermined pixels in a predetermined direction with respect to the threshold value disposition of the dither mask 61 which is set to have the noise characteristics having a peak on the high frequency side. For this reason, in a case where a dot position shift between the pixel groups occurs, it is possible to suppress variations in the dot covering ratio due to a position shift direction or amount. As a result, it is possible to suppress printing image quality from being deteriorated due to occurrence of density unevenness in a printing image of the common region. In addition, the threshold value disposition of the dither mask 61 which is a base of the dither mask 62 has the noise characteristics having a peak on the high frequency side, and thus a printed image shows characteristics close to the so-called blue noise characteristic at least in the common region, thereby securing a predetermined extent of graininess.

FIG. 19 shows an example of the effect achieved by the printer 20. FIG. 19 shows a simulation result. Specifically, for a dot formation pattern using a dither mask showing a favorable blue noise characteristic, cases where various amounts of Bi-D shifts occur in the main scanning direction and the sub-scanning direction are set, and a covering ratio is obtained and is plotted for each case. The transverse axis of FIG. 9 expresses a sum value of position shift amounts in the main scanning direction and the sub-scanning direction (hereinafter, also referred to as a total shift amount). The pre-requisites of the simulation are as follows.

(1) Grayscale value: 80/255
(2) Interlacing process: taskey mode
(3) Dot size: a diameter of the dot is twice the size between pixels
(4) Position shift amount: as follows With respect to the position shift amount, seven types of shift amounts are set as a shift amount in the main scanning direction by employing 0 pixels and between 0.5 and 5.5 pixels with one pixel interval. In addition, as a shift amount in the sub-scanning direction, nine types of shift amounts are set by employing between 0 to 4 pixels with 0.5 pixel interval. In FIG. 19, covering ratios of the cases (51 types) where the total shift amount is less than 7 pixels among the cases of the Bi-D shift of all the combinations (63 types) of the shift amounts are plotted.

As shown in FIG. 19, upon comparison of the case where the total shift amount is 0 pixels and the case where it is 2 pixels, a difference of 10% or more occurs in the covering ratio. On the other hand, if the total shift amount becomes larger than 2 pixels, it can be seen that a variation amount of the covering ratio is decreased according to an increase in the total shift amount. Upon comparison of the case where the total shift amount is 2 pixels with the case where it is 3 pixels, a variation in the covering ratio is about 2%. In addition, if the total shift amount exceeds 5 pixels, a variation in the covering ratio is very stable, and thus the covering ratio is hardly varied even if the total shift amount is increased. This corresponds to the fact that the dot pair generation ratio K nearly converges on $k^2$ if a threshold value shift amount is equal to or more than 5 pixels when the above-described dither mask 62 is generated.

Here, in a case where a threshold value shift amount when the dither mask 62 is generated is 5 pixels, if a position shift amount occurring in practice is ±2 pixels, a range of the substantial position shift amount shown in a printing image is a range of 3 pixels to 7 pixels. In this range, a variation width of the covering ratio is less than 2%. On the other hand, in a case where a threshold value shift amount when the dither mask 62 is generated is 0 pixels, that is, in a case of using the dither mask 61 in the related art having the blue noise characteristic, if a position shift amount occurring in practice is ±2 pixels, a range of the substantial position shift amount shown in a printing image is a range of −2 pixels to 2 pixels. In this range, a variation width of the covering ratio is equal to or more than 14%.

As is clear from the above description, the dither mask 62 can considerably suppress a variation in the covering ration. A local variation in the covering ratio means occurrence of density unevenness in a printing image. Therefore, if the variation in the covering ratio in the printing image is suppressed by the use of the dither mask 62, it is possible to considerably suppress the occurrence of density unevenness.

The threshold value disposition of the dither mask 62 where the threshold values are shifted with respect to the threshold value disposition of the dither mask 61 exerts the same influence on printing image quality as a position shift occurring in a case of using the dither mask 61, and thus graininess is more deteriorated than in the dither mask 61.

However, the threshold value disposition of the dither mask 61 which is a base of the dither mask 62 is set to have noise characteristics having a peak on the high frequency side for each of the outward movement pixel group and the inward movement pixel group, and thus a printing image which is printed using the dither mask 62 can suppress such deterioration. That is to say, the dither mask 62 can suppress degradation in the graininess and considerably suppress occurrence of density unevenness.

The above-described dither mask 62 is generated by shifting threshold values corresponding to a part of groups, among the threshold values of the dither mask 61 having the favorable blue noise characteristic. Therefore, the dither mask 62 has a predetermined property. That is to say, the dither mask 62 has a property that, if a plurality of dither masks where threshold values corresponding to a part of pixel groups in the threshold value disposition of the dither mask 62 are shifted by various amounts in various directions are generated, a dither mask where threshold values are shifted by a certain amount in a certain direction among the plurality of dither masks has a more favorable blue noise characteristic than the dither mask 62, and thus a printing image has improved graininess. In other words, it can also be said that the dither mask 62 maintains the dot pair generation ratio K close to the white noise mask, and ultimately has a spatial frequency characteristic closer to the blue noise mask than the white noise mask.

B. Modified Examples

Modified examples of the above-described embodiment will be described.

B-1. Modified Example 1

In the above-described embodiment, in step S231, the pixel groups of a printing image are divided into a pixel group formed by the outward movement dots and a pixel group formed by the inward movement dot, and the dither mask 62 is generated by shifting threshold values corresponding to any one of the pixel groups by predetermined pixels in a predetermined direction with respect to the threshold value disposition of the dither mask 61. However, the divided pixel groups are not limited to the above-described example, and may be pixel groups having different printing conditions.

For example, in a case where an image of a predetermined region is printed through a plurality of main scannings of the printing head 90, pixel groups of the printing image may be divided into pixel groups where dots are formed by different main scannings of the plurality of main scannings. For example, the attention region shown in FIG. 3 is formed through repetition of regions where an image is completed by the paths 1 to 4. Therefore, the pixel groups of the printing image may be divided into four groups 1 to 4. In this case, in the threshold value shifting process, using one pixel group, for example, the pixel group 1 as a reference, threshold values corresponding to at least one of the other pixel groups 2 to 4 may be shifted. For example, threshold values corresponding to the pixel group 2 may be shifted by 4 pixels in the main scanning direction, threshold values corresponding to the pixel group 3 may be shifted by 4 pixels in the sub-scanning direction, and threshold values corresponding to the pixel group 4 may be shifted by 2 pixels in the main scanning direction and 2 pixels in the sub-scanning direction. A threshold value shift direction or amount may be appropriately set in consideration of position shift generation characteristics between paths.

B-2. Modified Example 2

Although the evaluation values E are calculated in the overall printing grayscale range and the threshold value disposition of the dither mask 61 is determined in the above-described embodiment, threshold value disposition may be determined based on evaluation values E in a part of the printing grayscale range. For example, in a high grayscale printing region where dot dispersibility is not greatly problematic, threshold value disposition of the dither mask 61 may be set by other methods.

B-3. Modified Example 3

Although the dither mask 61 and the dither mask 62 are stored in the EEPROM 60 in advance in the above-described embodiment, the invention is not limited thereto. For example, either the dither mask 61 or the dither mask 62 may be stored in the EEPROM 60 in advance. In this case, the CPU 40 may function as a dither mask generation portion, and may generate the other dither mask from one of the dither mask 61 and the dither mask 62. Of course, in the halftone process, a dither mask is not necessarily selected depending on the kind of printing medium, but the printer 20 may store only the dither mask 62 and use the dither mask 62 in a fixed manner regardless of the kind of printing medium, or may change and use a dither mask different from the dither mask 61, and the dither mask 62.

B-4. Modified Example 4

Figure 20:
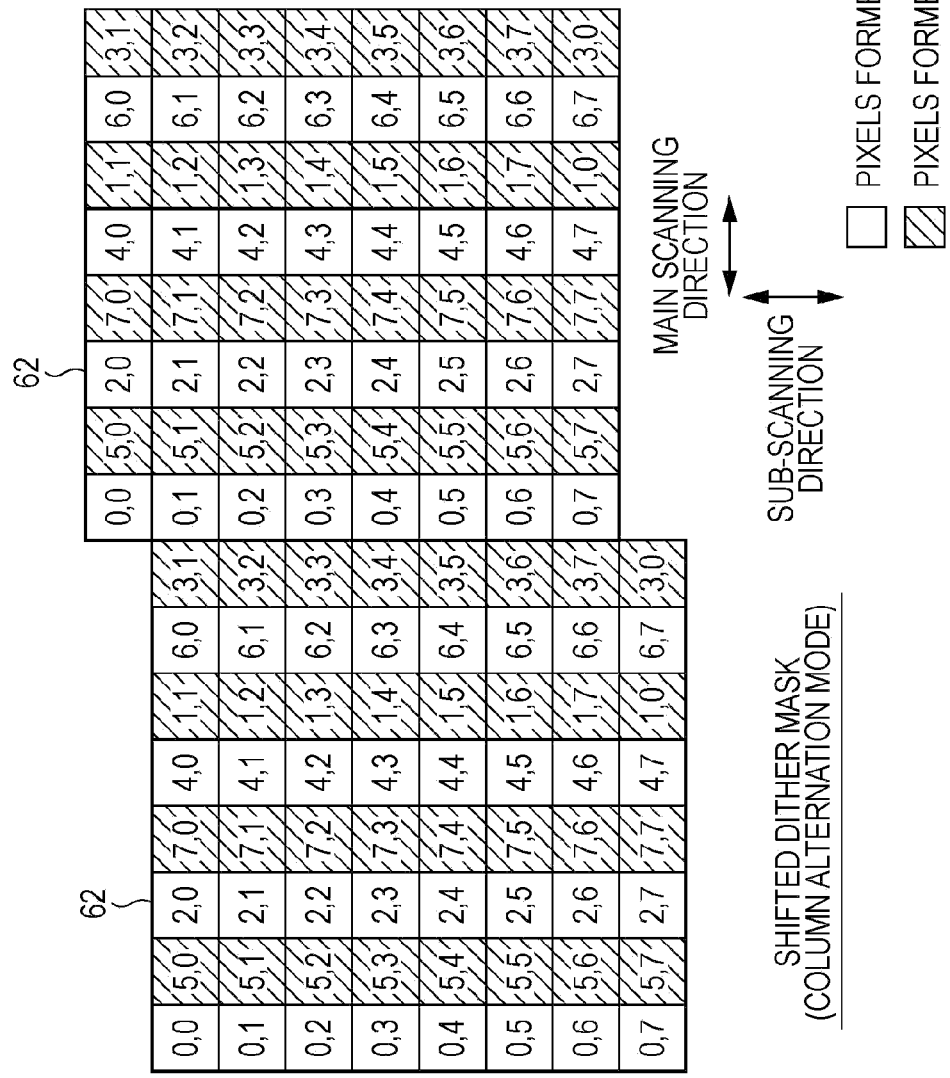
FIG. 20 is a diagram illustrating threshold value disposition of the dither mask according to a modified example.

In the halftone process, when a dither mask is repeatedly applied a plurality of times in the main scanning direction, there are cases where an applied position of the dither mask is shifted by a predetermined amount. A threshold value shifting process in this case will be described. A threshold value disposition example of the dither mask 62 which has undergone the threshold value shifting process is shown in FIG. 20. In this example, as shown in the figure, when the dither mask 62 is applied a plurality of times in the main scanning direction, a case is shown in which an applied position of the dither mask is shifted by one pixel in the sub-scanning direction.

In this example, the inward movement threshold values are shifted by four pixels in the main scanning direction (leftward in the figure) with respect to the dither mask 61. In addition to such a shift, the threshold values "1,x" and "3,x" (where x is an integer of 0 to 7) of the inward movement threshold values are shifted by one pixel in the sub-scanning direction (upward in the figure). This is because the dither mask 61 is optimized on the premise that the dither mask 61 is applied through shift by a predetermined amount in the sub-scanning direction. Specifically, if attention is paid to, for example, the inward movement threshold values in the dither mask 61, the dither mask 61 is optimized such that the inward movement threshold value around "7,0" becomes "1,1". In the threshold value disposition shown in FIG. 20, in order to maintain such a relative relationship of the inward movement threshold values, the threshold values "1,x" and "3,x" among the inward movement threshold values are shifted by one pixel in the sub-scanning direction. This maintains the pre-requisites of the dither mask 61, which is thus preferable since graininess can be suppressed from being deteriorated.

B-5. Modified Example 5

Although the graininess index is used as an evaluation value Eq indicating a dot dispersion extent in the above-described embodiment, the evaluation value Eq may be a value for evaluating a dispersion extent in dot disposition. For example, the evaluation value Eq may use RMS graininess. The RMS graininess is a well-known technique (for example, JP-A-2007-174272) and thus detailed description thereof will be omitted, but is a technique in which a low-pass filter process is performed for a dot density value using a low-pass filter, and a standard deviation for the density value having undergone the low-pass filter process is calculated. Alternatively, a dot density having undergone an appropriate low-pass filter process such as a filter of a weighting value which is inversely proportional to a distance from a pixel position may be used as the evaluation value Eq.

B-6. Modified Example 6

Although an example where the printing apparatus according to the above-described embodiment of the invention is implemented as a serial printer has been described, the invention may be widely applied to printing apparatuses where dots are formed through division into a plurality of pixel groups having different printing conditions, and at least a part of the dot formation by the plurality of pixel groups is performed in a common region, thereby outputting printing images. The different printing conditions may be timings and positions when and where dots are formed, and a difference in the printing head or the nozzles.

For example, the printing apparatus according to the embodiment of the invention may be implemented as an ink jet type line printer. Specifically, for example, the printing apparatus may be a line printer having a plurality of printing heads which are arranged over a printing range and form dots on a printing medium. In such a line printer, the printing heads adjacent to each other among a plurality of printing heads may partially overlap each other in the direction where the printing heads are arranged. In the overlapping region, dots formed by two printing heads are combined with each other, thereby completing a printing image. In the line printer, in step S231, pixel groups may be divided into pixel groups where dots are formed by different printing heads among a plurality of printing heads.

Alternatively, the printing apparatus may be a line printer having a plurality of nozzle strings of which nozzles are arranged over a printing range and which eject ink in a direction intersecting the arrangement direction of the nozzle strings, that is, in the paper feeding direction. Such a line printer has a plurality of nozzle strings, and thus it is possible to improve a printing resolution. That is to say, dots formed by two nozzle strings are combined with each other, thereby completing a printing image. If nozzle positions in the nozzle arrangement direction are the same between a plurality of nozzle strings, it is possible to improve a printing resolution in the paper feeding direction. In addition, if nozzle positions in the nozzle arrangement direction are different between a plurality of nozzle strings, it is possible to improve a printing resolution in the nozzle arrangement direction. In the line printer, in step S231, pixel groups may be divided into pixel groups where dots are formed by different nozzle strings among a plurality of nozzle strings. In this case, a plurality of nozzle strings may be provided in a single printing head or separately provided in different printing heads.

In addition, in a case where nozzles forming a nozzle string are arranged in a zigzag shape in the nozzle string arrangement direction, pixel groups may be divided into pixel groups where dots are formed by two nozzle groups forming the zigzag shape, that is, two nozzle groups having different positions in the paper feeding direction.

In the line printer, a position shift easily occurs in the paper feeding direction. Therefore, in the generation of the dither mask 62 used for the line printer, a shift amount in a direction different from the paper feeding direction, that is, a direction intersecting the paper feeding direction is preferably relatively large in the threshold value shifting process.

B-7. Modified Example 7

Although the printer 20 performs printing independently in the above-described embodiment, in a case where a printing process is performed in a printing system (a printing apparatus in a broad sense) where a printer and a computer (a computer as a terminal, a computer as a server, and the like) are connected to each other, a part of the printing process shown in FIG. 2 may be performed by the computer. For example, dot data having undergone the halftone process by an RIP (Raster Image Processor) may be printed by the printer 20.

As above, although the embodiment of the invention has been described, the elements other than the elements corresponding to the elements recited in the independent claims among the constituent elements in the above-described embodiment are additional elements, and may be appropriately omitted or combined. In addition, the invention is not limited to the embodiment and may be implemented in various forms without departing from the spirit of the invention. For example, the invention may be realized as a generation method of a dither mask, a manufacturing method of a printing apparatus, and the like in addition to the printing apparatus.

What is claimed is:

1. A printing apparatus which forms dots on a printing medium and prints an image, comprising:

a printing portion that forms the dots on the printing medium and prints the image according to dot data, indicating whether or not the dots are formed, generated through comparison of a grayscale value of each of pixels based on image data of the image to be printed with each of threshold values of a dither mask which is prepared in advance, wherein the printing portion forms the dots through division into a plurality of pixel groups having different printing conditions and performs at least a part of the dot formation by the plurality of pixel groups in a common region, wherein the dither mask has a second threshold value disposition where threshold values corresponding to a part of groups of the plurality of pixel groups are shifted by a predetermined pixel in a predetermined direction, with respect to a first threshold value disposition which is each of dispositions of the respective threshold values set such that distribution of dots formed in the common region has noise characteristics having a peak on a high frequency side in the spatial frequency region, in a case where a relative position of the dots between the pixel groups is formed in a target positional relationship which is a target in at least a part of a printing grayscale region, wherein the predetermined direction is one or two directions, wherein the printing apparatus has singularity in a direction where a relative position of dots between the pixel groups is shifted from a target positional relationship which is a target, and wherein, in relation to a shift amount of the threshold value in the second threshold value disposition, a shift amount in a direction different from a specific direction having the easily shifted singularity is larger than a shift amount in the specific direction.

2. The printing apparatus according to claim 1, wherein the first threshold value disposition is set such that, for each of the plurality of pixel groups, distribution of dots belonging to the pixel group has noise characteristics having a peak on the high frequency side in the spatial frequency region.

3. The printing apparatus according to claim 1, further comprising a dot data generation portion that generates the dot data using the dither mask.

4. The printing apparatus according to claim 3, further comprising a receiving portion that receives the kind of printing medium,
wherein the dot data generation portion configures the image so as to be printed according to the dot data which is generated using a first dither mask having the first threshold value disposition instead of a second dither mask which is the dither mask having the second threshold value disposition, and determines the dither mask which is used from the first dither mask and the second dither mask according to the received kind of printing medium.

5. The printing apparatus according to claim 4, further comprising a dither mask generation portion that generates the other dither mask by shifting threshold values corresponding to the part of groups of one dither mask with respect to the one dither mask of the first dither mask and the second dither mask.

6. The printing apparatus according to claim 1, wherein the printing portion forms the dots by reciprocating a printing head in a main scanning direction and ejecting ink from the printing head in both of an outward movement main scanning and an inward movement main scanning, and thereby prints the image, and
wherein the plurality of pixel groups include a pixel group where the dots are formed by the outward movement main scanning and a pixel group where the dots are formed by the inward movement main scanning.

7. The printing apparatus according to claim 1, wherein the printing portion forms the dots by making a printing head scan in a main scanning direction and ejecting ink from the printing head, and prints the image of a predetermined region by a plurality of main scannings, and wherein the plurality of pixel groups include the respective pixel groups where the dots are formed by different main scannings of the plurality of main scannings.

8. The printing apparatus according to claim 1, further comprising a plurality of printing heads that are arranged over a printing range and form the dots on the printing medium,
wherein the printing heads adjacent to each other among the plurality of printing heads partially overlap each other in the arrangement direction, and
wherein the printing portion forms the dots by relatively moving the printing medium with respect to the plurality of printing heads and ejecting ink from the plurality of printing heads, and thereby prints the image,
wherein the plurality of pixel groups include the respective pixel groups where the dots are formed by different printing heads among the plurality of printing heads, and
wherein the common region is a region where the printing heads adjacent to each other overlap each other.

9. The printing apparatus according to claim 1, further comprising a plurality of nozzle strings of which nozzles are arranged over a printing range and that eject ink and are provided in a direction intersecting the arrangement direction,
wherein the printing portion forms the dots by relatively moving the printing medium in the intersecting direction with respect to the plurality of nozzle strings and ejecting ink from the plurality of nozzle strings, and thereby prints the image, and
wherein the plurality of pixel groups include the respective pixel groups where the dots are formed by different nozzle strings among the plurality of nozzle strings.

10. A printing apparatus which forms dots on a printing medium and prints an image, comprising:
a printing portion that forms the dots on the printing medium and prints the image according to dot data, indicating whether or not the dots are formed, generated through comparison of a grayscale value of each of pixels based on image data of the image to be printed with each of threshold values of a dither mask which is prepared in advance,
wherein the printing portion forms the dots through division into a plurality of pixel groups having different printing conditions and performs at least a part of the dot formation by the plurality of pixel groups in a common region, and
wherein the dither mask has a threshold value disposition where threshold values corresponding to a part of groups of the plurality of pixel groups are shifted by a predetermined pixel in a predetermined direction, with respect to the respective dispositions of the threshold values which are set such that a covering ratio which is a ratio of the area where each of the dots covers the printing medium is larger than that when the dots are formed to be shifted from the target positional relationship, in a case where a relative position of the dots between the plurality of pixel groups is formed in a target positional relationship which is a target in at least a part of a printing grayscale region.

11. A manufacturing method of a dither mask in a printing apparatus which forms dots on a printing medium and prints an image by performing the dot formation on the printing medium through division into a plurality of pixel groups having different printing conditions and performing at least a part of the dot formation by the plurality of pixel groups in a common region, wherein the dither mask, formed by the respective threshold values, is used to generate dot data indicating whether or not the dots are formed, through comparison of a grayscale value of each of pixels based on image data of the image to be printed with each of threshold values of a dither mask which is prepared in advance, the method comprising:
determining a disposition of the respective threshold values which are set such that distribution of dots formed in the common region has noise characteristics having a peak on a high frequency side in the spatial frequency region, in a case where a relative position of the dots between the pixel groups is formed in a target positional relationship which is a target in at least a part of a printing grayscale region; and
generating the dither mask by shifting threshold values corresponding to a part of groups of the plurality of pixel groups by a predetermined pixel in a predetermined direction, with respect to each of the dispositions of the threshold values determined in the determining of the disposition,
wherein the predetermined direction is one or two directions, wherein the printing apparatus has singularity in a direction where a relative position of dots between the pixel groups is shifted from a target positional relationship which is a target, and wherein, in relation to a shift amount of the threshold value in the second threshold value disposition, a shift amount in a direction different from a specific direction having the easily shifted singularity is larger than a shift amount in the specific direction.

12. A manufacturing method of a printing apparatus which forms dots on a printing medium, prints an image, and includes a printing portion that forms the dots on the printing medium and prints the image according to dot data, indicating whether or not the dots are formed, generated through comparison of a grayscale value of each of pixels based on image data of the image to be printed with each of threshold values of a dither mask which is prepared in advance; and a storage portion that stores the dither mask, wherein the printing portion forms the dots through division into a plurality of pixel groups having different printing conditions and performs at least a part of the dot formation by the plurality of pixel groups in a common region, the method comprising:

preparing the printing apparatus; determining a disposition of the respective threshold values of the dither mask which are set such that distribution of dots formed in the common region has noise characteristics having a peak on a high frequency side in the spatial frequency region, in a case where a relative position of the dots between the pixel groups is formed in a target positional relationship which is a target in at least a part of a printing grayscale region;

generating the dither mask by shifting threshold values corresponding to a part of groups of the plurality of pixel groups by a predetermined pixel in a predetermined direction, with respect to each of the dispositions of the threshold values determined in the determining of the disposition; and recording the generated dither mask in the storage portion in a computer readable manner, wherein the predetermined direction is one or two directions, wherein the printing apparatus has singularity in a direction where a relative position of dots between the pixel groups is shifted from a target positional relationship which is a target, and wherein, in relation to a shift amount of the threshold value in the second threshold value disposition, a shift amount in a direction different from a specific direction having the easily shifted singularity is larger than a shift amount in the specific direction.

* * * * *